(12) United States Patent
Zhang et al.

(10) Patent No.: US 11,714,787 B2
(45) Date of Patent: Aug. 1, 2023

(54) CONSTRUCTION METHOD, DEVICE, COMPUTING DEVICE, AND STORAGE MEDIUM FOR CONSTRUCTING PATENT KNOWLEDGE DATABASE

(71) Applicant: ZFusion Technology Co., Ltd. Xiamen, Fujian (CN)

(72) Inventors: Longhui Zhang, Fujian (CN); Lei Li, Fujian (CN)

(73) Assignee: ZFusion Technology Co., Ltd. Xiamen, Fujian (CN)

( * ) Notice: Subject to any disclaimer, the term of this patent is extended or adjusted under 35 U.S.C. 154(b) by 123 days.

(21) Appl. No.: 17/105,471

(22) Filed: Nov. 25, 2020

(65) Prior Publication Data
US 2021/0081376 A1 Mar. 18, 2021

Related U.S. Application Data

(63) Continuation of application No. PCT/CN2019/088394, filed on May 24, 2019.

(30) Foreign Application Priority Data

May 25, 2018 (CN) .......................... 201810517395.0

(51) Int. Cl.
*G06F 16/21* (2019.01)
*G06N 5/02* (2023.01)
*G06N 5/022* (2023.01)

(52) U.S. Cl.
CPC ............. *G06F 16/21* (2019.01); *G06N 5/022* (2013.01)

(58) Field of Classification Search
CPC ............................... G06F 16/21; G06N 5/022
See application file for complete search history.

(56) References Cited

U.S. PATENT DOCUMENTS 7,092,857 B1 8/2006 Steiner
2011/0218947 A1 9/2011 Vadlamani et al.
(Continued)

FOREIGN PATENT DOCUMENTS

CN 101539906 A 9/2009
CN 102375909 A 3/2012
(Continued)

OTHER PUBLICATIONS

International Search Report with English Translation, cited in PCT/CN2019/088394 dated Aug. 27, 2019, 5 pages.
(Continued)

*Primary Examiner* — Sherief Badawi
*Assistant Examiner* — Earl Levi Elias
(74) *Attorney, Agent, or Firm* — Cooper Legal Group, LLC

(57) ABSTRACT

The present disclosure discloses construction method, device, computing device, and storage medium for constructing patent knowledge database. The method comprises: obtaining patent resource data; analyzing the patent resource data to obtain explicit information and implicit information, the explicit information comprises attribute information of each entity in a preset entity set, the implicit information comprises an entity relationship of technical elements; fusing the implicit information to obtain fused implicit information; and constructing the patent knowledge database according to the explicit information and the fused implicit information.

13 Claims, 11 Drawing Sheets

(56) References Cited

U.S. PATENT DOCUMENTS

| | | | |
|---|---|---|---|
| 2014/0046653 A1 | 2/2014 | Gopalakrishnan et al. | |
| 2015/0187033 A1* | 7/2015 | Sukman | G06F 40/169 |
| | | | 705/310 |
| 2017/0213136 A1* | 7/2017 | Barker | G06N 5/04 |
| 2018/0246972 A1* | 8/2018 | Shukla | G06F 16/9535 |
| 2019/0179839 A1* | 6/2019 | Elias | G06F 16/3322 |
| 2019/0294695 A1* | 9/2019 | Stoyanovsky | G06F 16/951 |

FOREIGN PATENT DOCUMENTS

| | | | |
|---|---|---|---|
| CN | 104252446 A | 12/2014 | |
| CN | 106294639 A | 1/2017 | |
| CN | 106897392 A | 6/2017 | |
| CN | 107609169 A | 1/2018 | |
| CN | 107622122 A | 1/2018 | |
| CN | 108763445 A | 11/2018 | |
| WO | 2015077942 A1 | 6/2015 | |
| WO | WO-2019173444 A1 * | 9/2019 | G06F 16/93 |

OTHER PUBLICATIONS

Written Opinion with English Translation cited in PCT/CN2019/088394 dated Aug. 27, 2019, 9 pages.

Gong, et al, "Construction and application of the patent knowledge system for supporting product innovation", vol. 20, No. 4, Aug. 2013, 7 pages.

Li, et al., "A Preliminary Research of Identifying Technology Opportunity in Nano Biomedical Material Field Based on Patent Literatures", vol. 24, No. 2, Mar. 2013, 7 pages.

Supplementary European Search Report, cited in EP19808492 dated Jan. 25, 2022, 2 pages.

\* cited by examiner

CONSTRUCTION METHOD, DEVICE, COMPUTING DEVICE, AND STORAGE MEDIUM FOR CONSTRUCTING PATENT KNOWLEDGE DATABASE

RELATED APPLICATIONS

This application is a continuation of International Patent Application PCT/CN2019/088394, filed on May 24, 2019, which claims priority to Chinese patent application number 201810517395.0, filed on May 25, 2018. International Patent Application PCT/CN2019/088394 and Chinese patent application number 201810517395.0 are incorporated herein by reference.

FIELD OF THE DISCLOSURE

The present disclosure relates to data processing technology, and in particular relates to a construction method, a device, a computing device, and a storage medium for constructing a patent knowledge database.

BACKGROUND OF THE DISCLOSURE

With the rapid development of science and technology in different fields, patent protection has become an important part of economic activities. More and more companies and research institutions protect their core technologies through patent portfolio planning, patent management, and patent applications.

In the information society, the full and effective use of various information resources is a prerequisite for scientific research and decision-making Patent documents are the world's largest source of technical information. According to statistics from the Organization for Economic Cooperation and Development (OECD), patent documents contain more than 80% of all scientific and technological knowledge, and most of this technical information has not been published in other publications. At present, there are more than 100 million patent documents in the world, and an average of several million patent documents are published every year. Patent documents include important research results, rich technical details, and experimental data, and have great commercial and scientific value.

In Chinese patent application number 201710891269.7, an analysis method is disclosed. The method extracts keywords from patent documents and conducts patent searches by keywords to improve the accuracy and comprehensiveness of patent searches.

In Chinese patent application number 201710891276.7, a database-based back-stage management and analysis system for patent titles is proposed. The system uses a keyword extraction module to extract keywords in a patent titles, and then submits the keywords to a data classification module for classification, which is convenient for users to search patent subjects.

However, the number of patent documents is large, the length is huge, technical and legal terms coexist, and the words are unfamiliar. The existing methods for extracting keywords still cannot extract highly general and effective patent information from the massive patent documents.

BRIEF SUMMARY OF THE DISCLOSURE

In order to solve the above technical problems, the present disclosure provides a method, a device, a computing device, and a storage medium for constructing a patent knowledge database, which can efficiently analyze massive patent resource data and extract effective patent information from the patent resource data.

First, the present disclosure provides a method for constructing a patent knowledge database, comprising: obtaining patent resource data; analyzing the patent resource data to obtain explicit information and implicit information, the explicit information comprises attribute information of each entity in a preset entity set, the implicit information comprises an entity relationship of technical elements; fusing the implicit information to obtain fused implicit information, and constructing the patent knowledge database according to the explicit information and the fused implicit information. The patent resource data comprises a patent specification and one or more drawings corresponding to the patent specification. Analyzing the patent resource data to obtain the implicit information comprises: processing the patent specification and the one or more drawings to obtain the entity relationship of the technical elements through a specification-drawing matching analysis method.

In an embodiment, analyzing the patent resource data to obtain the explicit information comprises: extracting the explicit information from structural information from the patent specification through a named entity recognition algorithm.

In an embodiment, processing the patent specification and the one or more drawings through the specification-drawing matching analysis method comprises: extracting reference numbers of the technical elements and position information of the reference numbers from the one or more drawings by an image analysis algorithm; extracting description information corresponding to each of the reference numbers from the patent specification; determining a directional relationship between the reference numbers according to the position information of the reference numbers; and matching the reference numbers, the directional relationship between the reference numbers, and the description information corresponding to the reference numbers to obtain the entity relationship of the technical elements.

In an embodiment, processing the patent specification and the one or more drawings through the specification-drawing matching analysis method further comprises: matching the reference numbers, the position information of the reference numbers, and the description information corresponding to the reference numbers.

In an embodiment, the image analysis algorithm comprises a supervised learning algorithm based on a deep neural network model.

In an embodiment, extracting the reference numbers of the technical elements and the position information of the reference numbers from the one or more drawings through the supervised learning algorithm based on the deep neural network model comprises: extracting basic feature information of the one or more drawings through a feature extraction convolutional network in the deep neural network model; and processing the basic feature information through a specification detection convolutional network in the deep neural network model to detect the reference numbers and the position information of the reference numbers.

In an embodiment, a loss function of the deep neural network model is:

$$L(x, c, l, g) = \frac{1}{N}(L_{conf}(x, c) + \alpha L_{loc}(x, l, g))$$

wherein, x represents a matching matrix of the reference numbers, c represents a confidence of a detection, l represents a predicted reference number position, g represents a real reference number position, N represents a number of default bounding boxes that matches real bounding boxes, $L_{conf}(x,c)$ represents a loss of the confidence, $L_{loc}(x, l, g)$ represents a loss of the position information, and a represents a balance factor.

In an embodiment, extracting the description information corresponding to each of the reference numbers from the patent specification comprises: extracting named entities from the patent specification through a supervised learning algorithm based on a bi-LSTM (Long Short Term Memory) network model; and associating the named entities and the reference numbers to obtain the description information corresponding to each of the reference numbers.

In an embodiment, matching the reference numbers, the directional relationship between the reference numbers, and the description information corresponding to the reference numbers comprises: matching the description information corresponding to the reference numbers to the reference numbers in the drawings to obtain a directional relationship between various description information; and generating a relationship graph according to the directional relationship among the various description information and storing the relationship graph.

In an embodiment, the implicit information further comprises an entity relationship of technical terms; and analyzing the patent resource data to obtain the implicit information comprises: processing the patent specification to obtain the entity relationship of the technical terms by a reasoning algorithm based on specification analysis.

In an embodiment, processing the patent specification by the reasoning algorithm based on the specification analysis comprises: processing the patent specification through at least one of a term frequency statistical algorithm, a co-word analysis algorithm, or a term embedding analysis algorithm.

In an embodiment, fusing the implicit information comprises: generating corresponding feature vectors according to various entity relationships included in the implicit information; using a linear classifier to judge the various entity relationships according to the feature vectors; calculating a probability that the various entity relationships are real relationships; and filtering the various entity relationships whose probability are less than a set threshold.

Second, the present disclosure further provides a device for constructing a patent knowledge database, the device comprises a resource acquisition module, a knowledge extraction module, a fusion processing module, and a construction module.

The resource acquisition module is used to acquire the patent resource data.

The knowledge extraction module is used to analyze the patent resource data to obtain explicit information and implicit information. The explicit information comprises attribute information of each entity in a preset entity set, and the implicit information comprises an entity relationship of technical elements.

The fusion processing module is used to fuse the implicit information to obtain fused implicit information.

The construction module is used to construct the patent knowledge database according to the explicit information and the fused implicit information.

In an embodiment, the patent resource data comprises a patent specification. The knowledge extraction module comprises a structural information processing module for extracting the explicit information from structural information from the patent specification by a named entity recognition algorithm.

In an embodiment, the patent resource data comprises the one or more drawings corresponding to the patent specification. The knowledge extraction module further comprises a specification-drawing matching analysis module, which is used to process the patent specification and the drawings to obtain the entity relationship of the technical elements by a specification-drawing matching analysis method.

In an embodiment, the specification-drawing matching analysis module comprises an image analysis module, a description information extraction module, a relationship determining module, and a matching module.

The image analysis module is configured to extract reference numbers of the technical elements and position information of the reference numbers from the one or more drawings through an image analysis algorithm.

The description information extraction module is configured to extract the description information corresponding to each of the reference numbers from the patent specification.

The relationship determining module is configured to determine a directional relationship between the reference numbers according to the position information of the reference numbers.

The matching module is configured to match the reference numbers, the directional relationship between the reference numbers, and description information corresponding to the reference numbers to obtain an entity relationship of the technical elements.

In an embodiment, the matching module is also used to match the reference numbers, the position information of the reference numbers, and the description information corresponding to the reference numbers.

In an embodiment, an image analysis algorithm comprises a supervised learning algorithm based on a deep neural network model.

In an embodiment, the image analysis module comprises a basic feature extraction module and a specification detection module.

The basic feature extraction module is configured to extract basic feature information of the one or more drawings through a feature extraction convolutional network in the deep neural network model.

The specification detection module is configured to process the basic feature information through the specification detection convolutional network in the deep neural network model and detect the reference numbers and the position information of the reference numbers.

In an embodiment, the description information extraction module comprises a named entity extraction module and an association processing module.

The named entity extraction module is configured to extract the named entity from the patent specification through a supervised learning algorithm based on a bi-LSTM network model.

The association processing module is configured to associate the named entity with the reference numbers to obtain the description information corresponding to each of the reference numbers.

In an embodiment, the matching module comprises a reflecting module and a generating module. The reflecting module is used to match the description information corresponding to the reference numbers to the reference numbers in the one or more drawings to obtain a directional relationship among various description information. The generating module is used to generate a relationship graph according to the directional relationship among the various description information and to store the relationship graph.

In an embodiment, the implicit information further comprises an entity relationship of technical terms. The knowledge extraction module further comprises a specification analysis module for processing the patent specification to obtain the entity relationship of the technical terms through a reasoning algorithm based on specification analysis.

In an embodiment, the specification analysis module comprises a term frequency statistical module, a co-word analysis module, and a term embedding analysis module.

The term frequency statistical module is configured to process the patent specification through a term frequency statistical algorithm.

The co-word analysis module is configured to process the patent specification through a co-word analysis algorithm.

The term embedding analysis module is configured to process the patent specification through a term embedding analysis algorithm.

In an embodiment, the fusion processing module comprises a feature vector generating module, a probability calculation module, and a filtering module.

The feature vector generating module is configured to generate corresponding feature vectors according to various entity relationships included in the implicit information;

The probability calculation module is configured to judge the various entity relationships according to the feature vectors by a linear classifier and calculate a probability that the various entity relationships are real relationships.

The filtering module is configured to filter the various entity relationships whose probability is less than a set threshold.

Third, the present disclosure provides a computer device. The computer device comprises a memory and a processor, and a computer program is stored in the memory. The processor implements the following method executing the computer program: obtaining patent resource data; analyzing the patent resource data to obtain explicit information and implicit information, the explicit information comprises attribute information of each entity in a preset entity set, and the implicit information comprises an entity relationship of technical elements; fusing the implicit information to obtain fused implicit information; and constructing a patent knowledge database according to the explicit information and the fused implicit information.

Fourth, the present disclosure provides a computer-readable storage medium. A computer program is stored on the computer-readable storage medium, and when the computer program is executed by a processor, the computer program implements the following method: obtaining patent resource data; analyzing the patent resource data to obtain explicit information and implicit information, the explicit information comprises attribute information of each entity in a preset entity set, and the implicit information comprises an entity relationship of technical elements; fusing the implicit information to obtain fused implicit information; and constructing a patent knowledge database according to the explicit information and the fused implicit information.

The method, device, computing device, and storage medium for constructing the patent knowledge database is provided for obtaining patent resource data, extracting, from the patent resource data, explicit information (such as patentee, application date, application number, etc.) that characterizes explicit knowledge, and analyzing implicit information that characterizes the implicit knowledge. The implicit information comprises the entity relationship of the technical elements, and the entity relationship of the technical elements can substantially reflect the technical problem information, technical means information, and technical effect information comprised in the technical solution. Then through the fusion processing of the implicit information, the noise data is filtered, and the patent knowledge database is constructed based on the explicit information and the implicit information after the fusion processing. Therefore, the present disclosure can efficiently analyze massive patent resource data and extract effective and abundant patent information therefrom and has extensive practical application value.

DETAILED DESCRIPTION OF THE EMBODIMENTS

In order to make clear the objective, the technical solution, and the advantages of the present disclosure, the present disclosure will be further described below in combination with the accompanying drawing and embodiments. It should be obvious that the embodiments described below will be only used to explain the present disclosure and will not limit the scope of the present disclosure.

Figure 1:
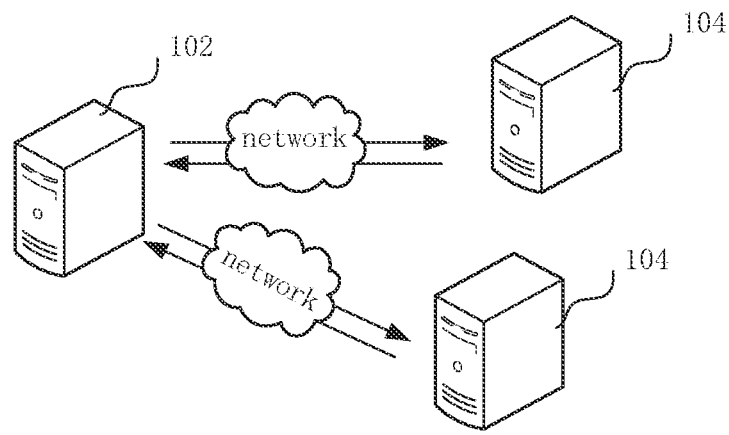
FIG. 1 illustrates an application environment diagram for a method for constructing a patent knowledge database according to an embodiment.

A method for constructing a patent knowledge database of the present disclosure can be applied to an application environment in FIG. 1. A patent knowledge database construction server 102 is in communication with various supply servers 104 configured to provide patent resource data through the network. Therein, the patent knowledge database construction server 102 and various supply servers 104 can be an independent server or a server cluster comprising a plurality of servers.

Figure 2:
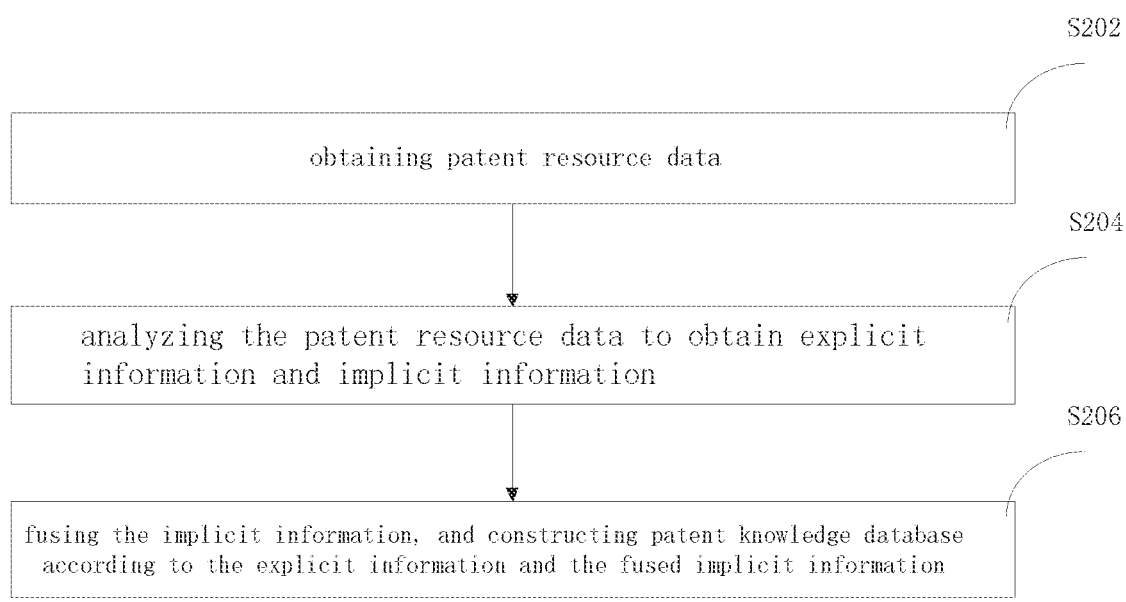
FIG. 2 illustrates a flowchart of a method for constructing a patent knowledge database according to an embodiment.

In an embodiment, referring to FIG. 2, a method for constructing a patent knowledge database is provided. For an example, the method is applied to the patent knowledge database construction server 102 in FIG. 1. The method comprises the following steps:

Step S202, obtaining patent resource data.

The patent resource data comprises various types of data relating to patent technology, for example, the specification. In an embodiment, the patent resource data can also comprise academic paper data (such as paper, metadata of academic papers, etc.), technical keyword data provided by various search engines (such as Baidu, Google, etc.), Wiki database, etc. This data all comprises technology relating information.

Patent resource data can be obtained from different types of network resources. For example, referring FIG. 1, the patent knowledge database construction server 102 obtains patent resource data from the various supply servers 104 in the network.

In addition, for the different types of network resources, patent resource data can be obtained by different data capturing strategies.

In an embodiment, after an approval of the Intellectual Property Office is obtained, document data (such as a patent specification) of the official database of Intellectual Property Office can be obtained through a web crawler, or related data can be downloaded from a data backup of Intellectual Property Office.

In an embodiment, a patent specification search API (Application Programming Interface) of a search engine (such as Baidu, Google, etc.) can be used to obtain a data clustering of technical keywords. Alternatively, the patent specification can be downloaded from a data backup of the patent specification of the search engine to obtain the patent specification.

In an embodiment, after an approval of a third-party patent specification provider is obtained, the data clustering of technical keywords is obtained through the API provided by the third-party patent specification provider.

In an embodiment, the patent resource data is downloaded from the data backup of the wiki database or the conceptual hierarchical definition of the wiki database and functions as a backup data source for a fusion of the patent knowledge database.

In an embodiment, after an approval of an academic institution is obtained, related academic data (such as an academic paper) can be downloaded from a database of the academic institution. Alternatively, metadata of the related academic data can be obtained from a website of the academic institution through a web crawler.

Step S204, analyzing the patent resource data to obtain explicit information and implicit information.

Therein, the explicit information comprises attribute information of each entity in a preset entity cluster. Entities in the preset entity cluster comprise, but are not limited to, patent title, application date, patentee, patent number, classification number, priority applicant, etc. The attribute information of each entity in the preset entity cluster can be directly extracted from patent resource data through various extraction methods without additional reasoning and information supplementation. For example, for the entity "applicant", attribute information of the entity can be a name of a patentee, such as "Zhang San", "Li Si", etc., or a name of a company, such as "Huawei Technology Co., Ltd.", "Apple", etc.

In some embodiments, the explicit information can be extracted from the patent resource data by a named entity recognition algorithm.

The implicit information comprises information obtained after analyzing the patent resource data through a reasoning algorithm. The implicit information is used to characterize an invention concept implicated in the patent resource data and can comprise technical problem information, technical means information used to solve technical problems, and technical effect information. The implicit information can be obtained from the various types of patent resource data, for example, the academic article data can be analyzed to function as a supplement of the technical solution of the patent specification. The technical problem, the technical means, and the technical effect can be transformed into an entity relationship between the technical elements in the technical solution. Therefore, in this embodiment, the implicit information comprises the entity relationship of the technical elements.

Specifically, the technical elements is entity objectives existing in the technical solution, and the technical elements can be a structural entity and a functional entity, such as various parts, functional components, structural components, etc. The entity relationship of the technical elements describes a kind of mutual restriction or connection that crosses categories and conceptual entity levels, mainly comprising containment relationship, connection relationship, protection relationship, etc. For example, a technical element "connecting rod" is connected to a technical element "base", and a technical element "power module" comprises a technical element "transformer", a technical element "rectifier unit", and a technical element "filter unit". The entity relationship of technical elements can be obtained by analyzing the specification in the patent resource data through various specification analysis methods.

The entity relationship of technical solutions can be stored as follows.

<IOS, OS, sub> means that an "IOS" system is a sub-concept of an operating system "OS".

<IOS, Iphone Operating System, full name> means that a full name of "IOS" system is "Iphone Operating System".

<IOS, Apple inc, owned> means that the "IOS" system is owned by "Apple inc".

<Springboard, IOS, component> means that "Springboard" is a component of the "IOS" system.

<handoff, handover, synonymous> means that "handoff" and "handover" are synonymous.

<ios, tasks schedule, technology> means that the "IOS" system relates to a technology of "tasks schedule".

<handoff, disruption, problem> means that there is a "disruption" problem in "handoff".

<Cellular telecommunication, handoff, parent> means that "Cellular telecommunication" is a superordinate concept of "handoff".

Optionally, the implicit information also comprises attribute information of the technical elements. Therein, the attribute information of the technical elements refers to characteristics of entities of the technical elements differing from other conceptual entities, such as processing feature attributes (material, shape, etc. of the technical elements). The attribute information of the technical elements can be extracted from the specification of the patent resource data.

Optionally, after the explicit information and implicit information is obtained, the explicit information and implicit information can be stored in the patent information entity database as a data source for subsequent processing.

Step S206, fusing the implicit information to obtain fused implicit information, and constructing a patent knowledge database based on the explicit information and the fused implicit information.

After the patent resource data is analyzed and processed, various explicit information and implicit information are obtained. However, because most of this patent resource data come from the network resources, there will inevitably be some noise data. Especially for the implicit information, since an acquisition process of the implicit information needs to be analyzed by reasoning algorithms, there will be more noise data. Therefore, in this embodiment, the implicit information is fused to filter out the noise data to obtain effective implicit information, and then the patent knowledge database is constructed based on the explicit information and the fused implicit information.

Therein, there are many methods of fusion processing. For example, an entity relationship fusion method, which can be used to identify an unreal entity relationship and perform fusion and filtering, is one example method of fusion processing.

For explicit information, fusion processing can also be performed to eliminate noise data.

A construction method of the patent knowledge database is as follows. After the patent resource data is obtained, the explicit information (such as patentee, application date, application number, etc.) that characterizes intuitive data is extracted, and the implicit information that characterizes an inventive concept is obtained, and then is fused, noise data is filtered, and the patent knowledge database based on the explicit information and the fused implicit information is constructed. Therefore, the present disclosure can efficiently analyze massive patent resource data and extract effective and abundant patent information and comprises extensive practical application value.

Figure 3:
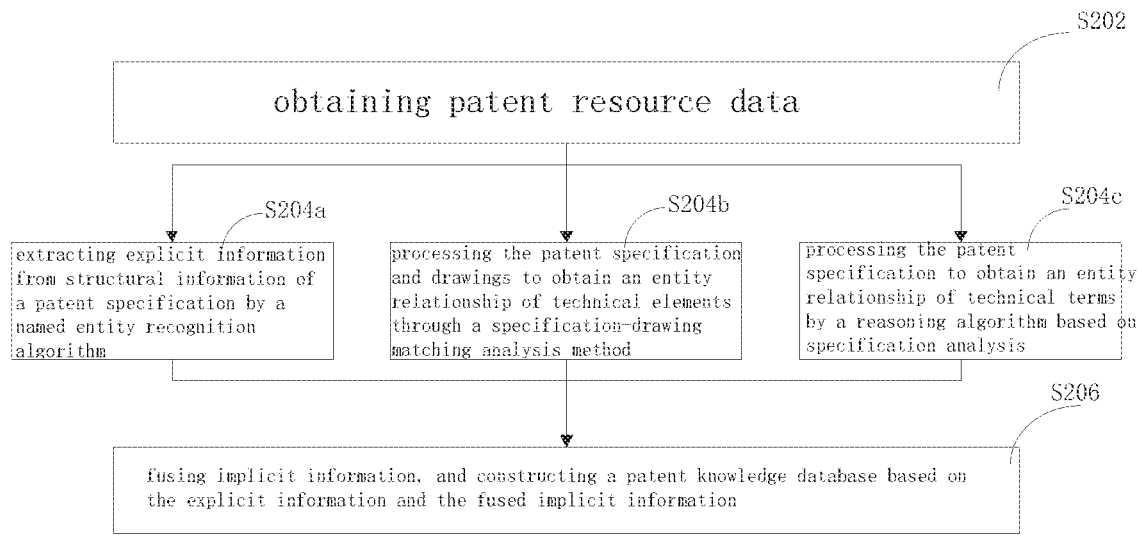
FIG. 3 illustrates a flowchart of a method for constructing a patent knowledge database according to another embodiment.

In an embodiment, referring to FIG. 3, the patent resource data comprises patent specification. The process for analyzing the patent resource data to obtain the explicit information comprises the following steps.

Step S204a, extracting the explicit information from structural information of the patent specification by the named entity recognition algorithm.

Therein, the structural information in the patent specification refers to data with a fixed format in the patent specification, such as claims, specification, and bibliographic items in the patent specification. The Named Entity Recognition (NER), also known as "proprietary name recognition" can identify entities with specific meanings in the specification, such as names of persons, places, organizations, proper nouns, etc. In this embodiment, attribute information of entities, for example, patent titles and patentees can be extracted from structural information, for example, bibliographic items and claims in the patent specification by the named entity recognition algorithm.

In an embodiment, referring to FIG. 3, the patent resource data also comprises drawings corresponding to the patent specification. The process for analyzing the patent resource data to obtain the implicit information comprises the following steps.

Step S204b, processing the patent specification and the drawings to obtain the entity relationship of the technical elements through a specification-drawing matching analysis method.

Figure 4:
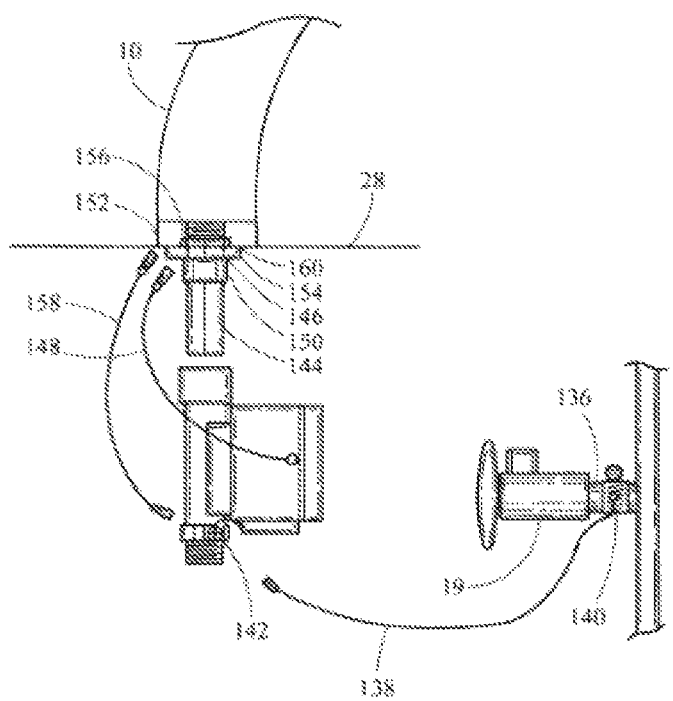
FIG. 4 illustrates a drawing corresponding to a patent specification according to an embodiment.

Specifically, in addition to a large number of patent specifications, the patent resource data also comprises a plurality of structural drawings. These drawings are generally images with black lines on a white background configured to describe content and a structure of the patent. Reference numbers are generally used to identify positions of the technical elements in these drawings, and the reference numbers are connected to the corresponding technical elements by a curve. Taking FIG. 4 as an example, a drawing obtained from a patent illustrates a front view of an automatic faucet. In FIG. 4, each reference number corresponds to a part of the faucet.

In this embodiment, the patent specification and the drawings are comprehensively considered and are processed by the specification-drawing matching analysis method to obtain the entity relationship of the technical elements included within the patent specification and the drawing(s), so that the implicit information can be extracted more comprehensively.

Figure 5:
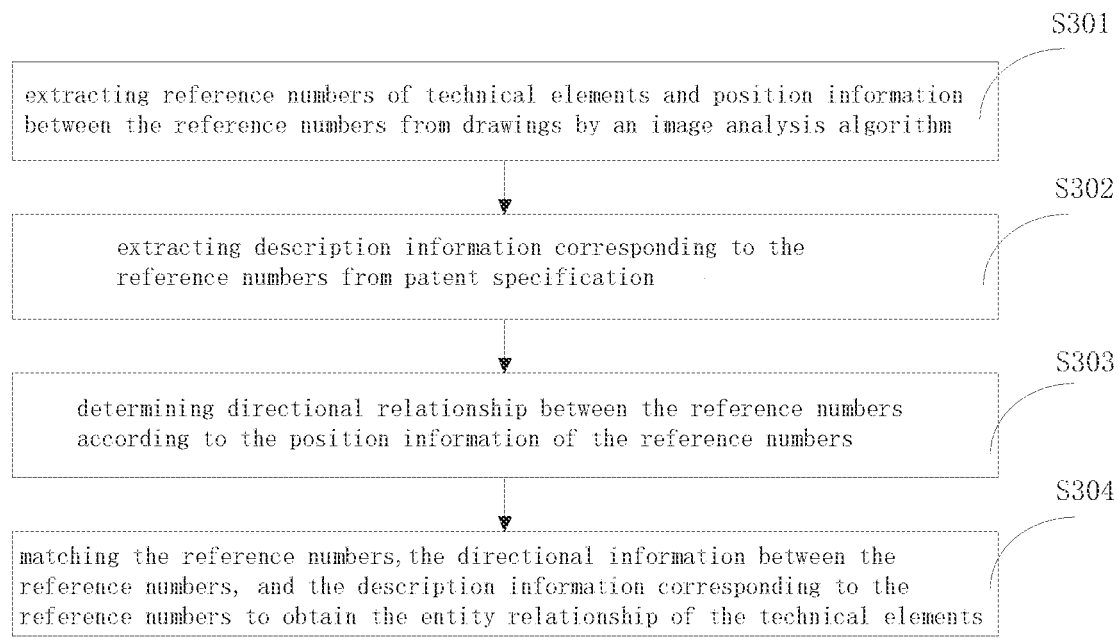
FIG. 5 illustrates a flowchart of a method for matching and analyzing specification and drawing according to an embodiment.

In an embodiment, the present disclosure further provides the specification-drawing matching analysis method. Referring to FIG. 5, the method comprises the following steps.

Step S301, extracting the reference numbers of the technical elements and position information between the reference numbers from the drawing(s) by an image analysis algorithm;

In this embodiment, the reference number of each technical element in the drawings can be extracted through the image analysis algorithm, and the position information of the reference number can be obtained. Optionally, the position information is represented by coordinates of the reference numbers.

Step S302, extracting description information corresponding to the reference numbers from the patent specification.

In the patent specification, the corresponding drawing will be briefly described, and the technical elements and a relationship between the technical elements identified in each drawing will be described in detail. Therefore, the patent specification comprises the description information corresponding to the reference numbers. For example, the patent specification comprises description information, for example, "water spray rod 198", "filter module 293", and "first through hole 485".

Therein, the description information from the patent specification can be extracted by a plurality of methods, for example, a method comprising the named entity recognition algorithm and a regular expression formula. The regular expression formula is also referred to as a rule expression formula and is a logical formula for a processing string. The regular expression formula uses some pre-defined specific characters and combinations of these specific characters to form a "rule string", and the "rule string" is used to express a filtering logic for the string.

Step S303, determining the directional relationship between the reference numbers according to the position information of the reference numbers.

Therein, the directional relationship between the reference numbers reflects the positional relationship between the technical elements corresponding to the reference numbers. For example, the directional relationship between the reference numbers of the structural parts in the drawing(s) can reflect the positional relationship and the matching relationship of the structural parts. There are many ways to determine the directional relationship between the reference numbers based on the position information of the reference numbers. For example, the directional relationship between the reference numbers can be calculated by a coordinate calculation method.

Step S304, matching the reference numbers, the directional relationship between the reference numbers, and the description information corresponding to the reference numbers to obtain the entity relationship of the technical elements.

The description information corresponding to the reference numbers in the patent specification is substantially a description of the technical elements corresponding to the reference numbers, and the directional relationship between the reference numbers substantially reflects the positional relationship between the technical elements, so that the reference number, the directional relationship between the reference numbers, and the description information corresponding to the reference numbers are matched to obtain the entity relationship between the technical elements.

Figure 6:
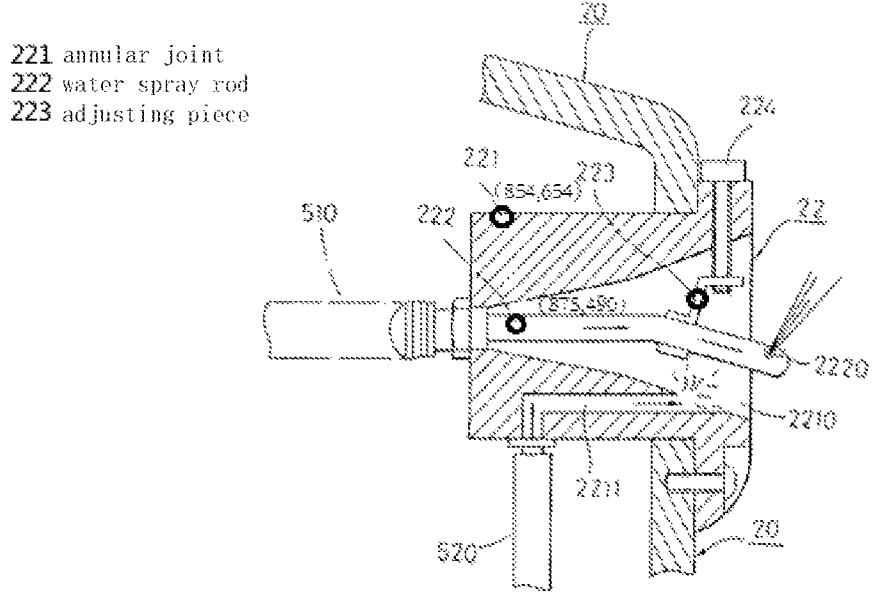
FIG. 6 illustrates a schematic diagram of extracting reference numbers of technical elements and directional relationships according to an embodiment.

For example, referring to FIG. 6, the reference number 221 and the reference number 222 can be extracted through the image analysis algorithm, and the position information of the reference number 221 and the reference number 222 can be determined; that is, the reference number 221 corresponds to the coordinates (854, 654), and the reference number 222 corresponds to the coordinates (875, 490). It is further determined through a coordinate calculation that the directional relationship between the two reference numbers is an internal and external relationship, so that the relationship between the technical elements being referenced by the reference numbers is also an internal and external relationship; that is, an inner side of the technical element referenced by reference number 221 is disposed with the technical element referenced by reference number 222. Through specification analysis, the description information "annular joint 221" corresponding to reference number 221 and the description information "water spray rod 222" corresponding to reference number 222 can be found in the patent specification. Therefore, through specification-drawing matching analysis, the entity relationship of the technical elements can be obtained: the water spray rod is disposed in the annular joint. The entity relationship can be expressed as <annular joint, water spray rod, inside>. Of course, the entity relationship can also be upper side, lower side, left side, and right side, or input and output relationships, etc. This is merely an example.

Figure 7:
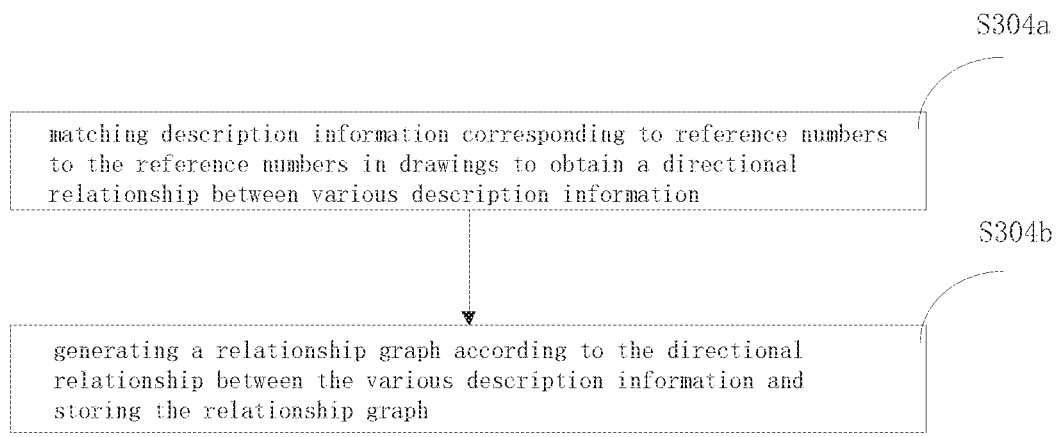
FIG. 7 illustrates a flowchart of matching reference numbers, directional relationships between the reference numbers, and description information corresponding to the reference numbers according to an embodiment.

In an embodiment, referring to FIG. 7, the process for matching reference numbers, the directional relationship between the reference numbers, and the description information corresponding to the reference numbers comprises the following steps Step S304a, matching the description information corresponding to the reference numbers to the reference numbers in the drawing(s) to obtain a directional relationship between various description information;

Step S304b, generating a relationship graph according to the directional relationship between the various description information and storing the relationship graph.

Specifically, since the directional relationship between the reference numbers is determined, the description information corresponding to the reference numbers and obtained from the patent specification is matched to the reference numbers in the drawing(s). According to the matching and the directional relationship between the known reference numbers, the directional relationship between the description information can be determined, and the directional relationship between the description information reflects the position relationship between the technical elements corresponding to the reference numbers. Then a graph is used to express the directional relationship between each description information. The graph is a relationship diagram. The relationship diagram can fully reflect the entity relationship of the technical elements, and can reflect the positional relationship between the technical elements. The map is stored in the patent information entity database to enrich a content of the patent information entity.

In an embodiment, the reference numbers, the position information of the reference numbers, and the description information corresponding to the reference numbers can also be matched.

Specifically, after the reference numbers in the drawing(s), the position information of the reference numbers, and the description information corresponding to the reference numbers in the patent specification are obtained, the three can be matched. According to the matching result, the entity relationship can be generated and be stored, or the matching result can be displayed in a corresponding position in the drawing(s).

Figure 8:
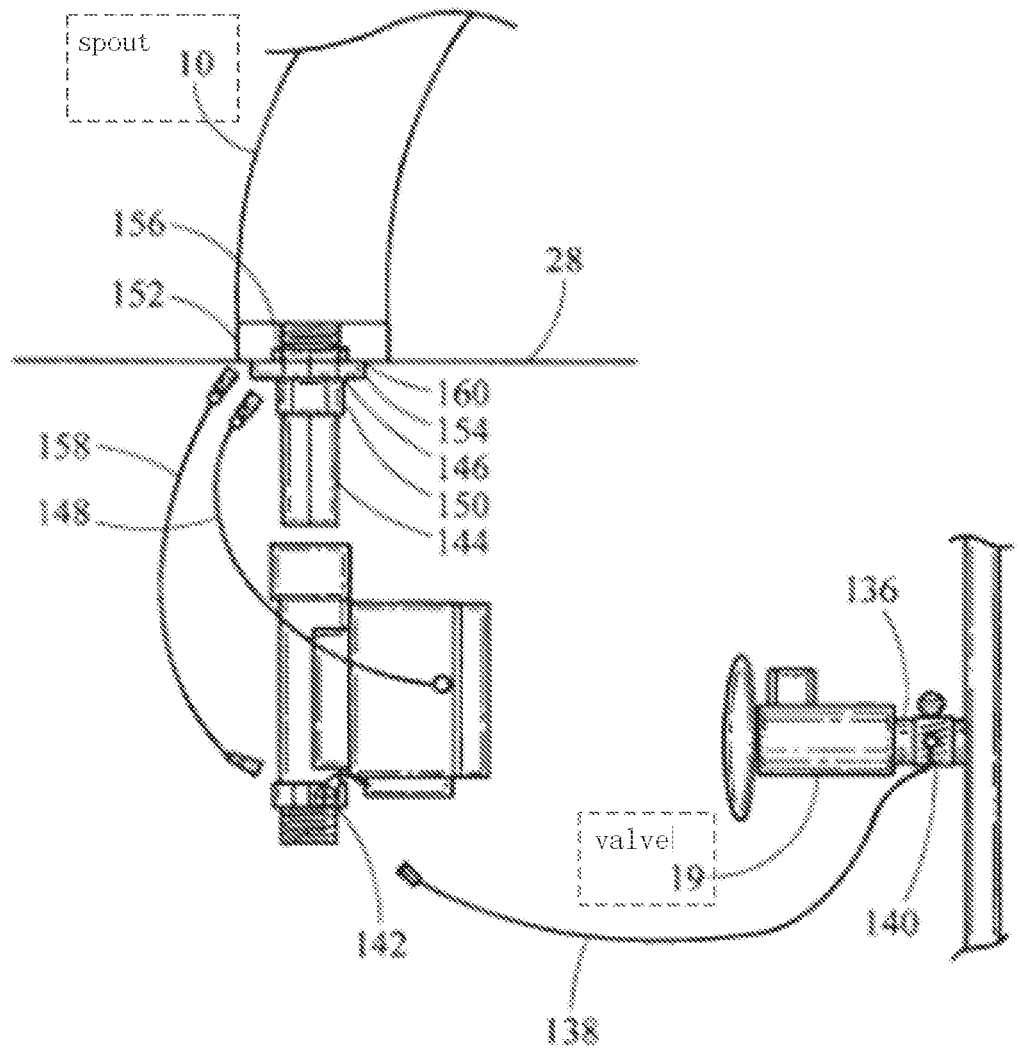
FIG. 8 illustrates a resulting view of the drawing that results from matching results according to an embodiment.

In an embodiment, for example, referring to FIG. 8, the description information corresponding to the reference numbers can be displayed in the corresponding position of the reference number in the drawing(s). For example, the "spout" is displayed in a corresponding position of the reference number 10, and the "valve" is displayed in a corresponding position of the reference number 19.

In addition, according to the matching results, the description information corresponding to the reference numbers in the patent specification can also be loaded and displayed in the drawing(s) through other ways, so that readers can obtain key technical information by reading the drawing(s). Various display ways will not be described here.

In most cases, the drawing(s) corresponding to the patent specification can be known as a general description of the technical solution of the patent. The reference numbers in the drawing(s), the position information of the reference numbers, and the description information corresponding to the reference numbers in the patent specification can be matched through the method of specification-drawing matching analysis of the embodiment, and the content of the drawing(s) can be enriched. The reader can directly obtain the key information from the drawing(s) corresponding to the specification to more fully understand the technical solution of the patent.

In an embodiment, a supervised learning algorithm based on a deep neural network model is used to analyze the drawing(s). The supervised learning algorithm needs to use a certain amount of training data. For this reason, it is necessary to manually mark the drawing(s) corresponding to the patent specification in advance, and the marking content comprises the reference numbers and the position information of the reference numbers. The process for marking the drawing(s) can be conventional and will not be described here.

After the training data is obtained through manual marking, the deep neural network model is trained to obtain the deep neural network model that meets objections of the instant application. Then the trained deep neural network model can be used to automatically mark new drawing(s) and identify the reference numbers and position information of the technical elements.

Figure 9:
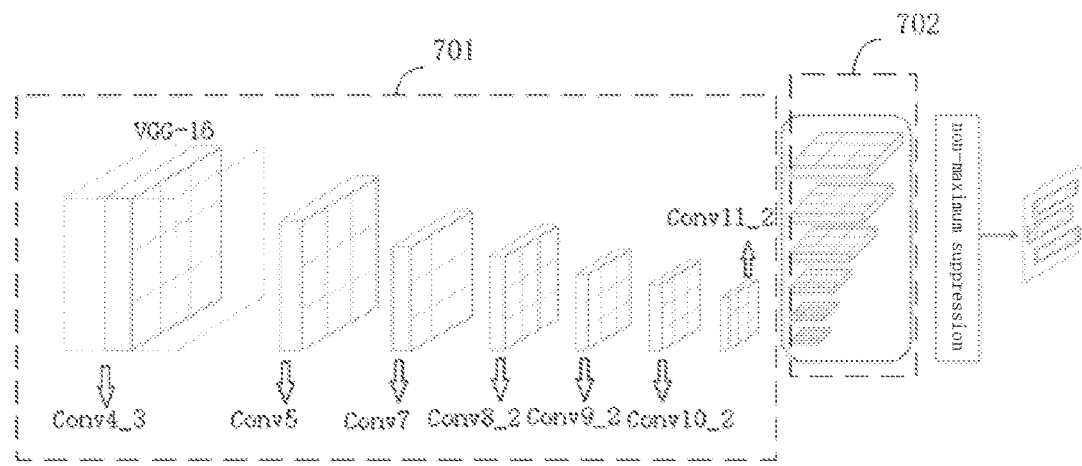
FIG. 9 illustrates a schematic view of a structure of a deep neural network model according to an embodiment.

In an embodiment, referring to FIG. 9, the deep neural network model structure of the present disclosure is illustrated. The deep neural network model comprises a feature extraction convolutional network 701 and a specification detection convolutional network 702.

Referring to FIG. 9, the deep neural network model structure inherits a classic VGG-16 network structure of the convolutional neural network, retains a network from conv1_1 to conv5_3 of the VGG-16 network structure, and converts the last two layers of fully connected network into convolutional networks, namely conv6 (not shown in the drawing) and conv7. In addition, according to the Max pooling technology, four convolutional networks (conv8 to conv11) are added to the convolutional network conv7 to define a feature extraction convolutional network 701. The feature extraction convolutional network 701 can well establish a localized representation of digital information in the drawing(s), and the convolutional networks are designed to extract the basic feature information in the drawing(s).

Besides the feature extraction convolutional network 701, this embodiment further discloses the specification detection convolution network 702 to detect the reference numbers and position information of the reference numbers in the drawing(s).

In an embodiment, still referring to FIG. 9, the specification detection convolutional network 702 has a 6-layer convolutional network structure, and an input of the network structure is basic feature information of an output of the feature extraction convolutional network 701, and an output of the specification detection convolutional network 702 undergoes a non-maximum compression, that is, referring to FIG. 9, a non-maximum suppression process, and to generate final reference numbers and position information of the reference numbers.

In an embodiment, the output of the specification detection convolutional network 702 comprises a directional bounding box $\{q\}$ or $\{r\}$, and a minimum horizontal bounding box $\{b\}$. $b_0=\{x_0, y_0, w_0, h_0\}$ is set to be a horizontal default bounding box, where $\{x_0,y_0\}$ represents a center point of the horizontal default bounding box, $w_0$ represents a width of the horizontal default bounding box, and $h_0$ represents a height of the horizontal default bounding box. $b_0$ can also be written as $q_0=(x_{01}^q, y_{01}^q, x_{02}^q, y_{02}^q, x_{03}^q, y_{03}^q, x_{04}^q, y_{04}^q)$ or $r_0=(x_{01}^r, y_{01}^r, x_{02}^r, y_{02}^r)$, where a calculation formula of each item is as follows:

$x_{01}^q=x_0-w_0/2, y_{01}^q=y_0-h_0/2,$ $x_{02}^q=x_0-w_0/2, y_{02}^q=y_0-h_0/2,$ $x_{03}^q=x_0-w_0/2, y_{03}^q=y_0-h_0/2,$ $x_{04}^q=x_0-w_0/2, y_{04}^q=y_0-h_0/2,$ $x_{01}^r=x_0-w_0/2, y_{01}^r=y_0-h_0/2,$ $x_{02}^r=x_0-w_0/2, y_{02}^r=y_0-h_0/2,$ $h_0^r=h_0$

For each position in the drawing(s), the deep neural network model will output a probability that the position is a text box and a corresponding offset of the position. The text box in the drawing(s) can be represented according to the calculation formula. The deep neural network model structure can learn the best representation parameters of each reference number in the drawing(s), that is, various parameters in the calculation formula.

When the deep neural network model is trained, it is necessary to determine a loss function of the training process. In an embodiment, the loss function of the deep neural network model is as follows:

$$L(x, c, l, g) = \frac{1}{N}(L_{conf}(x, c) + \alpha L_{loc}(x, l, g))$$

Therein, x represents a matching matrix of the reference numbers, c represents a confidence of a detection, l represents a predicted reference number position, g represents a real reference number position, N represents a number of default bounding boxes that match with real bounding boxes, $L_{conf}(x,c)$ represents a loss of the confidence, $L_{loc}(x, l, g)$ represents a loss of the position information loss, and a represents a balance factor.

Figure 10:
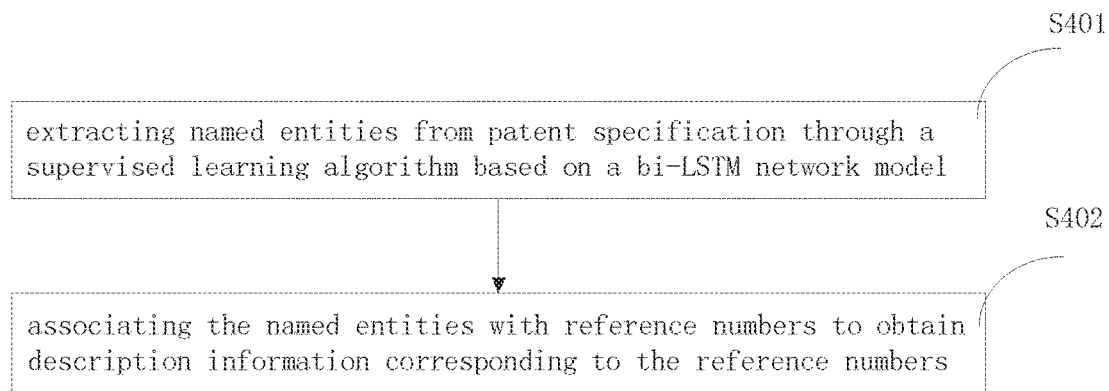
FIG. 10 illustrates a schematic diagram of a process of extracting description information corresponding to reference numbers from a patent specification according to an embodiment.

In an embodiment, referring to FIG. 10, a process for extracting the description information corresponding to the reference numbers from the patent specification comprises the following steps.

Step S401, extracting named entities from the patent specification through the supervised learning algorithm based on a bi-LSTM (Long Short Term Memory) network model.

In this embodiment, the supervised learning algorithm based on the bi-LSTM network model is used to extract the named entities in the patent specification. Since the supervised learning algorithm needs to use the certain amount of training data, it is necessary to manually mark the patent specification with the named entities in advance.

In an embodiment, reference symbols of the entity can be predefined, for example, B indicates a beginning of the entity, E indicates an end of the entity, and O indicates other information. For each sentence in the patent specification, the word segmentation is performed at first, and then according to each word, the predefined reference symbols of the entity can be used to mark the word. Examples are as follows.

FIG. 2 illustrates a specific method of constructing the faucet spout in an example patent.

O O O O O O O B E O O O O

In the example, "water faucet spout" is a named entity and is divided into two words "water faucet" and "spout". When being marked, these two words are respectively marked as the reference symbol "B" as the beginning of the entity and the reference symbol "E" as the end of the entity.

Figure 11:
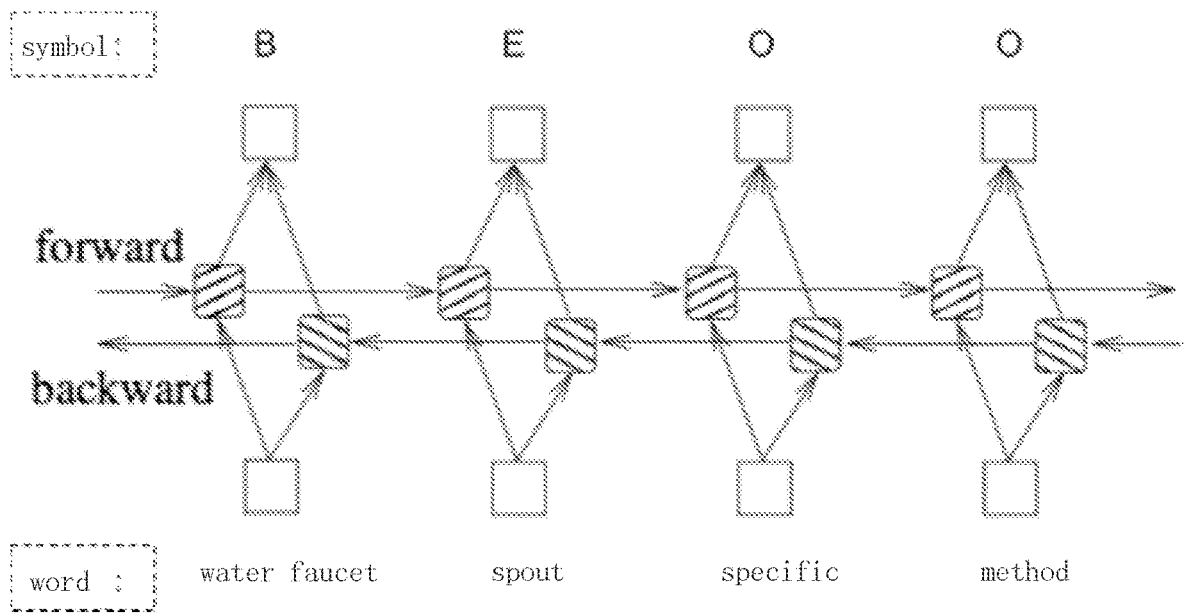
FIG. 11 illustrates a schematic diagram of a training bi-LSTM (Long Short Term Memory) network model according to an embodiment.

According to the process for training the bi-LSTM network model, in an embodiment, the specification and corresponding reference symbol of the specification can be known as two sequences. For the two sequences, past features and future features of the two sequences are simultaneously modeled by a forward network and a backward network of LSTM (referring to FIG. 11). A sliding window having a length of n is disposed respectively in the two sequences. For content of each sliding window, the forward network and backward network are used to describe characteristics of the sliding window, and then a CRF (conditional random field) method is used to mark words in the window. The CRF method comprises a state transition matrix, which can be used to effectively identify past reference and future reference.

A probability matrix of the output of the bi-LSTM network model is defined as $f_\theta$, and according to a sentence x, each element in this matrix represents a probability of a word t in the sentence x marked as i. According to the two sliding windows i and j, $[A]_{i,j}$ is introduced to function as a transition score from a state i to a state j. Therefore, a score g of a sentence along a certain identification path can be calculated by the following formula:

$$s([x]_1^T, [i]_1^T, \theta) = \sum_{t=1}^{T}([A]_{[i]_{t-1},[i]_t} + [f_\theta]_{[i]_t,t})$$

After the training data is obtained through manual marking, the bi-LSTM network model is trained, and then the bi-LSTM network model can be used to automatically mark new patent specifications and extract named entities in the patent specification.

Step S402, associating the named entities with the reference numbers to obtain the description information corresponding to the reference numbers.

After the named entity is identified, the reference numbers are corresponding to the corresponding named entities to obtain the description information corresponding to the reference numbers by the association processing method.

In an embodiment, the association processing method can be a rule-based method. The reference numbers in the patent specification can be easily detected, and the named entities corresponding with the reference numbers usually appear in the same sentence, either before or after the reference numbers. Therefore, a simple rule is formulated to associate the two together, and then the description information corresponding with the reference numbers in the patent specification is obtained through this rule.

In an embodiment, before the association processing, the extracted named entities are filtered to improve an efficiency and an accuracy of subsequent processing and to maintain an accuracy of the description information.

A more enriched entity relationship of technical elements can be obtained through the specification-drawing matching analysis method.

In an embodiment, referring to FIG. 3, the implicit information also comprises the entity relationship of technical terms, and the process for extracting the implicit information from the patent resource data comprises the following steps.

Step S204c, processing the patent specification to obtain the entity relationship of the technical terms by a reasoning algorithm based on specification analysis.

Most information in patent resource data is expressed in a form of the specification, so the specification analysis is the most important thing in constructing a patent knowledge database, especially the analysis of patent specifications. A focus of the reasoning algorithm based on specification analysis is to extract the important terms, a term relationship, and important technical elements in the patent specification, and abstract out the implicit information. In this embodiment, the reasoning algorithm based on specification analysis is developed about technical subjects, and the entity relationship of technical terms are extracted on the basis of the technical subjects.

In an embodiment, the process for processing the patent specification through the reasoning algorithm based on specification analysis comprises processing the patent specification through the term frequency statistical algorithm, the co-word analysis algorithm, and the term embedding analysis algorithm, respectively. Therein, the term frequency statistical algorithm, the co-word analysis algorithm, and the term embedding analysis algorithm are all existing algorithms.

Figure 12:
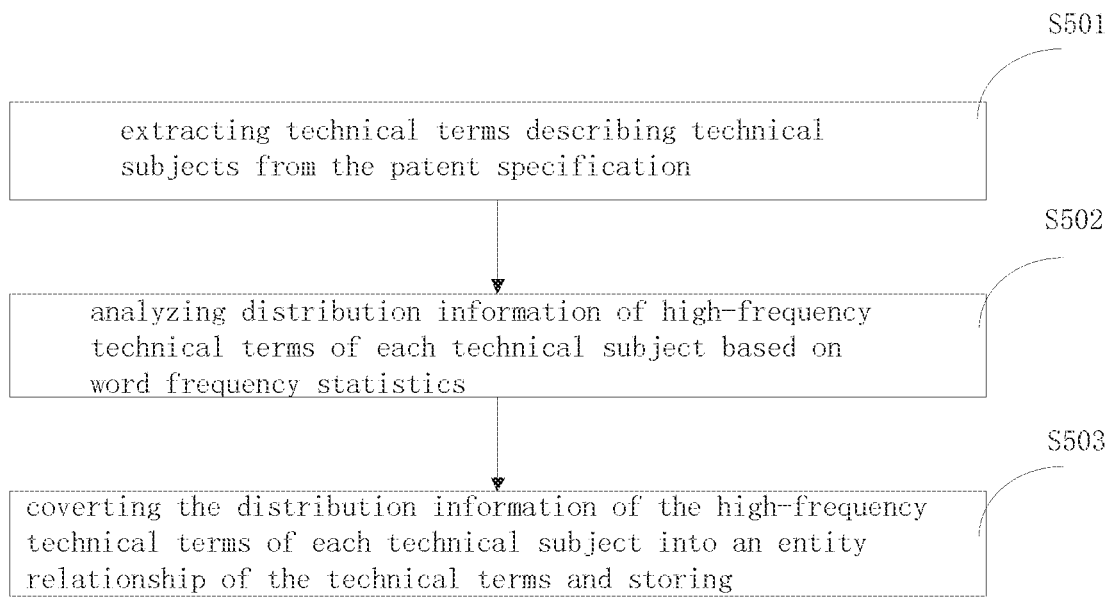
FIG. 12 illustrates a schematic diagram of processing patent specification through a term frequency statistical algorithm according to an embodiment.

In an embodiment, referring to FIG. 12, the present disclosure provides a method for processing the patent specification through the term frequency statistical algorithm, the method comprises the following steps.

Step S501, extracting the technical terms describing technical subjects from the patent specification;

Therein, the technical subject can be preset in advance. For example, a technical subject database is configured to store a plurality of technical subjects. Technical terms describing the technical subjects stored in the technical subject database can be extracted from the patent specification.

Optionally, the technical terms describing the technical subjects can be extracted from structural information of the patent specification (such as the claims, the title of the disclosure, the abstract of the specification, etc.).

Step S502, analyzing distribution information of high-frequency technical terms of each technical subject based on word frequency statistics.

Word frequency statistics, that is, an occurrence frequency of terms is counted and high-frequency terms are identified. Optionally, when word frequency statistics is performed, a time period for statistics can be selected, for example, to analyze patent specifications of each year. The distribution information of the high-frequency technical terms of each technical subject can be obtained through the word frequency statistics.

Step S503, converting the distribution information of the high-frequency technical terms of each technical subject into the entity relationship of the technical terms and storing.

Optionally, the high-frequency technical terms of the technical subject are converted into a relationship pair of "technical subject→year→high-frequency terms" (used to reflect the relationship between the technical subject, high-frequency technical terms, and year) and are stored. When the time periods of the statistics are different, the "year" in the relationship pair here can also be replaced with other time periods, for example, month.

Optionally, it is further possible to count a change of high-frequency technical terms of each technical subject over time, so that a development tendency of high-frequency technical terms of the same technical subject can be analyzed.

Figure 13:
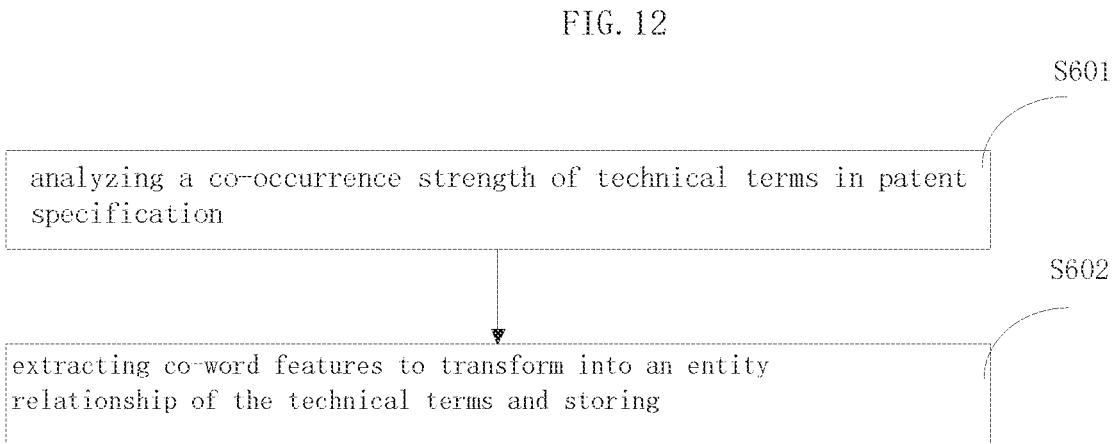
FIG. 13 illustrates a schematic diagram of processing patent specification through a co-word analysis algorithm according to an embodiment.

In an embodiment, referring to FIG. 13, the present disclosure also provides a method for processing a patent specification through a co-word analysis algorithm, the method comprising the following steps.

Step S601, analyzing a co-occurrence strength of technical terms in the patent specification.

Specifically, the co-occurrence strength of technical terms in the same patent specification is analyzed to reflect a relation between the technical terms. Optionally, a number of co-occurrences of technical terms in a sentence or a paragraph in the patent specification can be counted, and the co-occurrence strength can be calculated according to the number of co-occurrences.

Step S602, extracting co-word features based on the co-occurrence strength to transform into entity a relationship of the technical terms and storing.

Specifically, based on the co-occurrence strength of technical terms, the co-word features are extracted to obtain the entity relationship of technical terms by methods such as co-word network analysis, co-word cluster analysis, and strategy map analysis, etc.

Optionally, a probability of each pair of co-occurrence words (that is, co-occurrence technical terms) of any technical subject is calculated, a distribution of each pair of co-occurrence words of all technical subjects can be obtained and converted into a relationship pair of "technical subject→co-occurrence words→probability" (reflecting a corresponding relationship among technical subjects, co-occurrence words, and the probability of co-occurrence words of the technical subject), and the relationship pair is stored.

Figure 14:
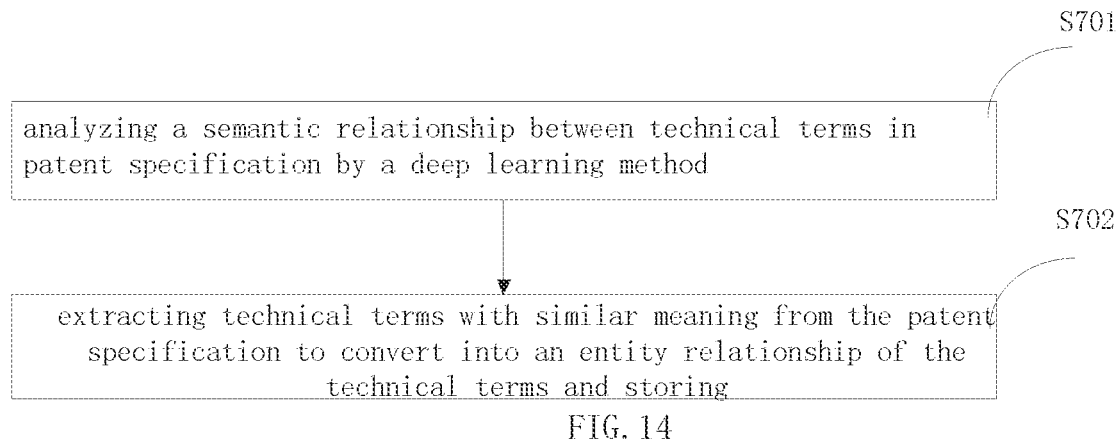
FIG. 14 illustrates a schematic diagram of processing patent specification through a term embedding analysis algorithm according to an embodiment.

In an embodiment, referring to FIG. 14, the present disclosure also provides a method for processing patent specification through term embedding analysis algorithm, the method comprises the following steps.

Step S701, analyzing a semantic relationship between the technical terms in the patent specification by a deep learning method.

Step S702, extracting technical terms with similar meaning from the patent specification to convert into technical subject information entities and storing the technical subject information entities in the patent information entity database.

For example, the patent specification is discretized, possible technical terms are extracted, and then each technical term in the patent specification is embedded by word2vec (word vector), and similar technical terms of each technical term is calculated according to the generated embedded vector, and then the similar technical terms is converted into the entity relationship of the technical terms and is stored. For example, a relationship pair of "technical terms→technical terms" (used to reflect the technical terms with similar meaning) is stored in the patent information entity database.

The technical subject can be determined by various existing methods. In an embodiment, the technical subject can be obtained through a text clustering algorithm, for example, the patent specification is clustered to define a plurality of clusters, and each cluster belongs to one technical subject; then a subject term for each cluster is generated, the subject term is used to describe technical subject. A plurality of technical subjects can be obtained through this processing method, and the corresponding technical subjects of each patent specification can be determined.

Figure 15:
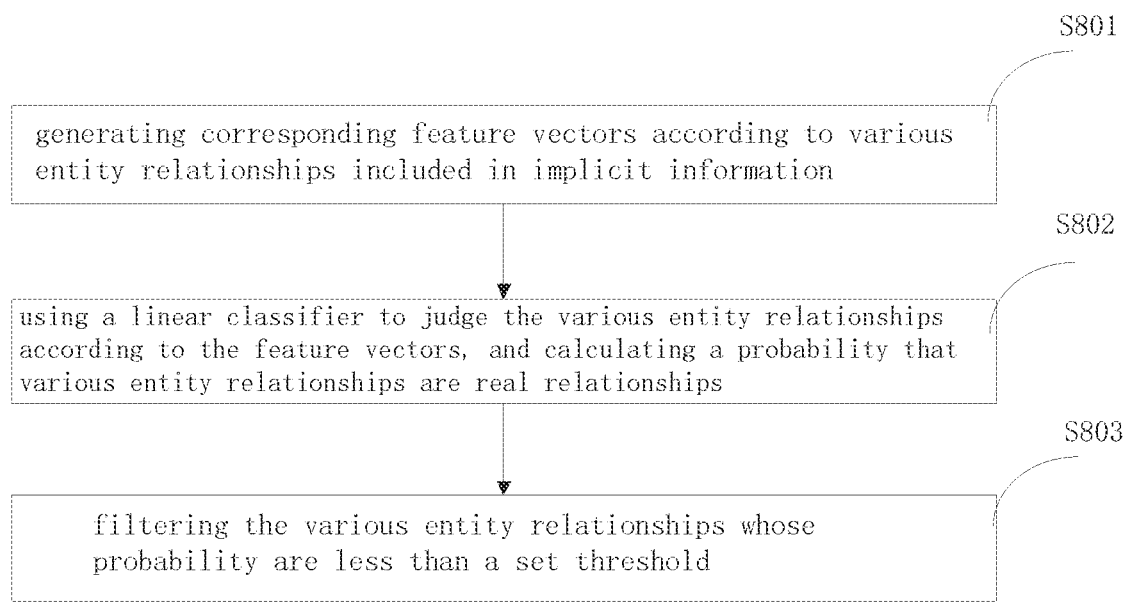
FIG. 15 illustrates a flowchart of fusion processing on an entity relationship according to an embodiment.

Through the above process, explicit information and implicit information can be extracted from patent resource data. However, the acquired patent resource data covers a wide range of fields, for example, a plurality of fields comprising finance, metallurgy, power industry, organic chemical industry, etc. At the same time, the patent resource data can also comprise other types of data besides patent specifications, such as Wikipedia database, Dbpedia database, etc. Since much of the data comes from the Internet, there will inevitably be some noise data in a huge amount of patent resource data. Therefore, in an embodiment, the present disclosure also provides a method for fusing implicit information, the noise data can be filtered out by this method. Referring to FIG. 15, the method comprises the following steps.

Step S801, generating corresponding feature vectors according to various entity relationships included in the implicit information.

Different entity relationships included in the implicit information are fused to obtain effective entity relationships. Therein, a corresponding feature vector is generated according to each entity relationship.

Optionally, the feature vector can be a two-dimensional digital feature vector, where a first dimension represents a square root of the number of patent resource data configured to obtain the entity relationship, and a second dimension represents an average value of scores of the entity relationship by a scoring method. The scoring method can be selected according to actual needs. Through the scoring method, a plurality of scores of each entity relationship can be obtained, and then the average of the plurality of scores can be calculated to obtain the second dimension of the feature vector.

Step S802, using a linear classifier to judge the various entity relationships according to the feature vectors, and calculating a probability that the various entity relationships are real relationships.

The linear classifier can predict each entity relationship and determine whether the entity relationship is the true relationship. Specifically, the feature vector corresponding to the entity relationship is processed by the linear classifier to calculate out the probability that the entity relationship is the true relationship. Optionally, the linear classifier can be a binary linear classifier.

Step S803, filtering the various entity relationships whose probability are less than a set threshold.

After the probability that each entity relationship is the true relationship is calculated, it can be screened and filtered according to the set threshold. In general, it can be considered that a probability approaching 1 as the true relationship. Of course, in practical applications, it can be measured by setting the threshold. If the probability is less than the set threshold, the entity relationship is considered to be not the true relationship, so the entity relationship is filtered. After filtering out these unreal entity relationships, the final implicit information can be obtained, which covers effective patent, and then the patent knowledge database is constructed based on the explicit information and the fused implicit information.

Through the above construction methods, the final patent knowledge database can be constructed. As the construction of the patent knowledge database is based on massive amounts of network data, with a rapid development of information technology today, an update speed of information is beyond manpower. For this reason, the patent knowledge database also needs to be maintained continuously according to a continuous updating of information. In an embodiment, the patent resource data is captured regularly to obtain an updating of the patent resource data, and the existing patent knowledge database is updated based on a newly generated patent resource data.

It should be understood that although the steps in the flowcharts are displayed in sequence as indicated by the arrows, these steps are not necessarily executed in the order indicated by the arrows. Unless explicitly stated in this disclosure, the execution of these steps is not strictly limited to the illustrated order, and these steps can be executed in other orders. Moreover, at least some of the steps in the flowcharts can comprise multiple sub-steps or multiple stages. These sub-steps or the stages are not necessarily executed at the same time, but can be executed at different times. The sequence for executing these sub-steps or the stages is not necessarily sequentially, but may be alternately or alternately with other steps or at least a portion of sub-steps or stages of other steps.

Figure 16:
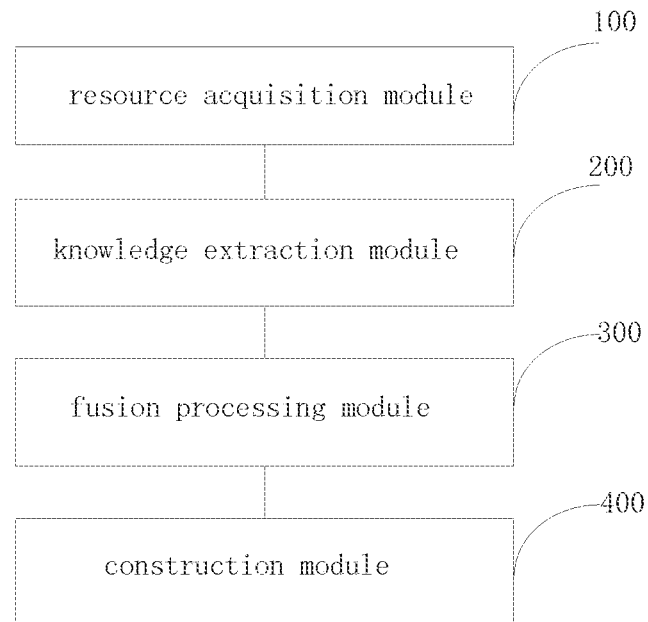
FIG. 16 illustrates a structural diagram of a constructing device for a patent knowledge database according to an embodiment.

In an embodiment, referring to FIG. 16, a device for constructing a patent knowledge database, the device comprises a resource acquisition module 100, a knowledge extraction module 200, a fusion processing module 300, and a construction module 400.

The resource acquisition module 100 is used to acquire the patent resource data.

The knowledge extraction module 200 is used to analyze the patent resource data to obtain explicit information and implicit information. The explicit information comprises attribute information of each entity in a preset entity set, and the implicit information comprises an entity relationship of technical elements.

The fusion processing module 300 is used to fuse the implicit information to obtain fused implicit information.

The construction module 400 is used to construct the patent knowledge database according to the explicit information and the fused implicit information.

Figure 17:
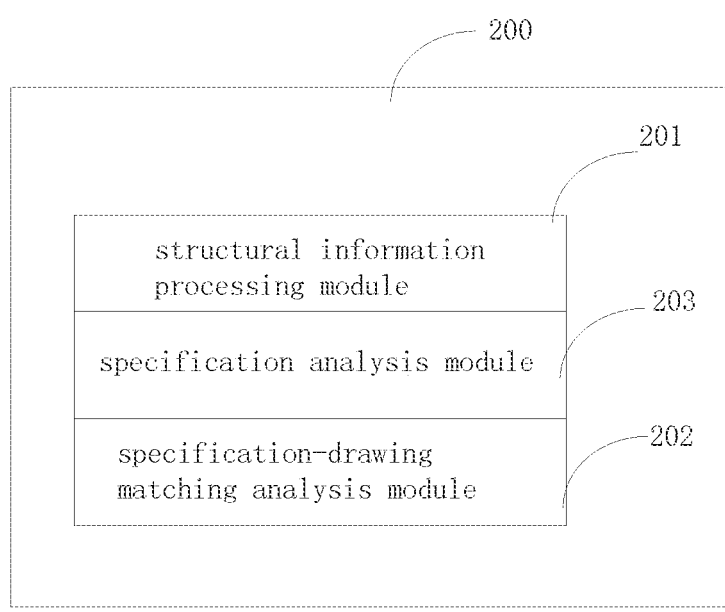
FIG. 17 illustrates a structural diagram of a data extraction module in according to embodiment.

In an embodiment, the patent resource data comprises a patent specification. Referring to FIG. 17, the knowledge extraction module 200 comprises a structural information processing module 201 for extracting the explicit information from structural information from the patent specification by a named entity recognition algorithm.

In an embodiment, the patent resource data comprises the drawing(s) corresponding to the patent specification. Still referring to FIG. 17, the knowledge extraction module 200 further comprises a specification-drawing matching analysis module 202, which is used to process the patent specification and the drawing(s) to obtain the entity relationship of the technical elements by a specification-drawing matching analysis method.

Figure 18:
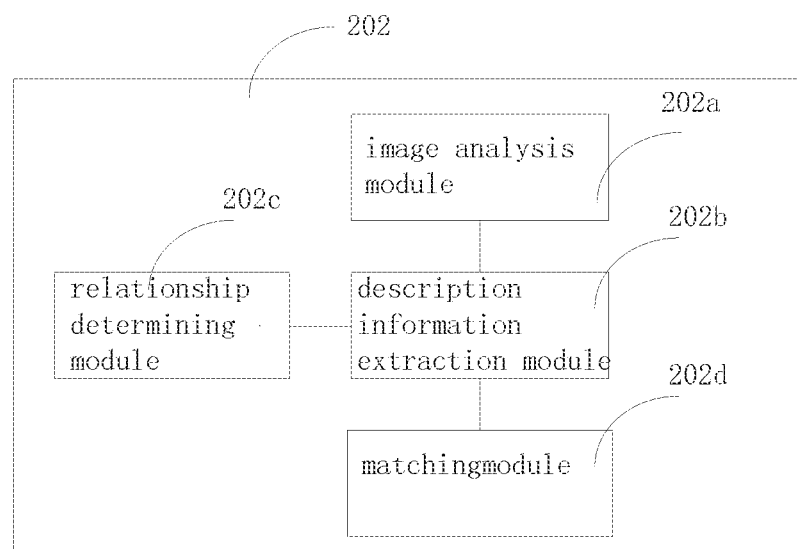
FIG. 18 illustrates a structural diagram of a matching and analyzing module for specifications and drawings according to an embodiment.

In an embodiment, referring to FIG. 18, the specification-drawing matching analysis module 202 comprises an image analysis module 202a, a description information extraction module 202b, a relationship determining module 202c, and a matching module 202d.

The image analysis module 202a is configured to extract reference numbers of the technical elements and position information of the reference numbers from the drawing(s) through an image analysis algorithm.

The description information extraction module 202b is configured to extract the description information corresponding to each of the reference numbers from the patent specification.

The relationship determining module 202c is configured to determine a directional relationship between the reference numbers according to the position information of the reference numbers.

The matching module 202d is configured to match the reference numbers, the directional relationship between the reference numbers, and description information corresponding to the reference numbers to obtain entity relationship of the technical elements.

In an embodiment, the matching module 202d is also used to match the reference numbers, the position information of the reference numbers, and the description information corresponding to the reference numbers.

In an embodiment, an image analysis algorithm for the image analysis module 202a comprises a supervised learning algorithm based on a deep neural network model.

Figure 19:
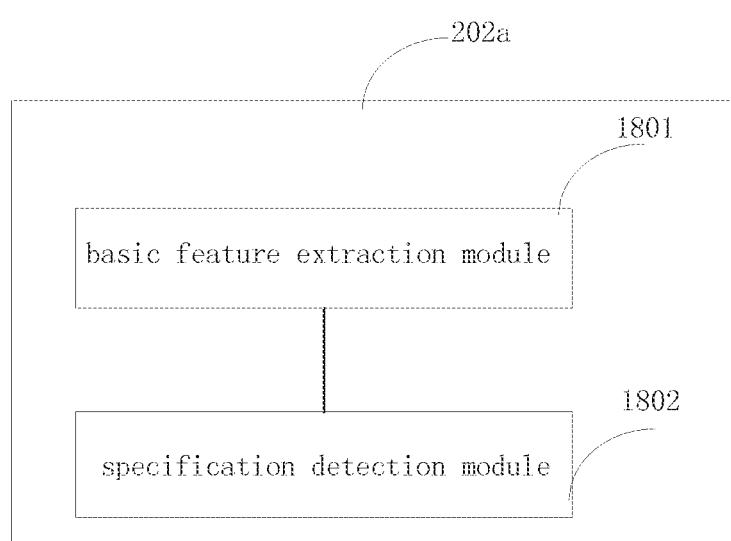
FIG. 19 illustrates a structural diagram of a drawing analyzing module according to an embodiment.

In an embodiment, referring to FIG. 19, the image analysis module 202a comprises a basic feature extraction module 1801 and a specification detection module 1802.

The basic feature extraction module 1801 is configured to extract basic feature information of the drawing(s) through a feature extraction convolutional network in the deep neural network model.

The specification detection module 1802 is configured to process the basic feature information through the specification detection convolutional network in the deep neural network model and detect the reference numbers and the position information of the reference numbers.

In an embodiment, a loss function of the deep neural network model is:

$$L(x, c, l, g) = \frac{1}{N}(L_{conf}(x, c) + \alpha L_{loc}(x, l, g))$$

Therein, x represents a matching matrix of the reference numbers, c represents a confidence of a detection, l represents a predicted reference number position, g represents a real reference number position, N represents a number of default bounding boxes that matches real bounding boxes, $L_{conf}(x,c)$ represents a loss of the confidence, $L_{loc}(x, l, g)$ represents a loss of the position information and a represents a balance factor.

Figure 20:
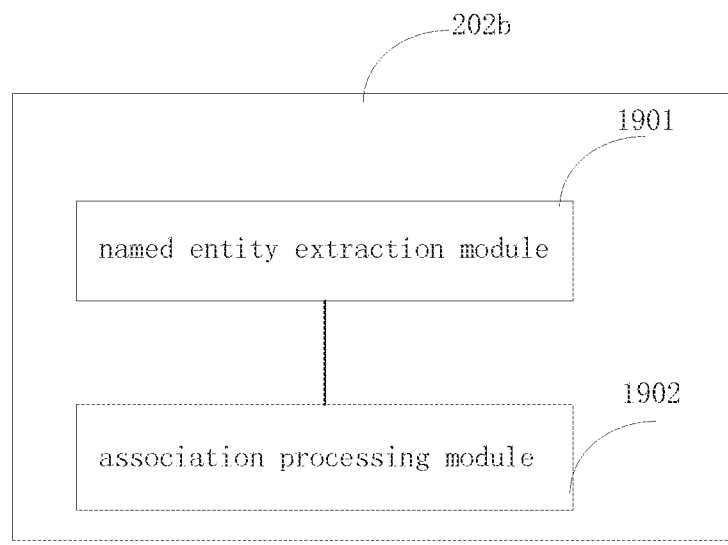
FIG. 20 illustrates a structural diagram of a specification information extraction module according to an embodiment.

In an embodiment, referring to FIG. 20, the description information extraction module 202b comprises a named entity extraction module 1901 and an association processing module 1902.

The named entity extraction module 1901 is configured to extract the named entity from the patent specification through a supervised learning algorithm based on a bi-LSTM network model.

The association processing module 1902 is configured to associate the named entity with the reference numbers to obtain the description information corresponding to each of the reference numbers.

In an embodiment, the matching module 202d comprises a reflecting module and a generating module. The reflecting module is used to match the description information corresponding to the reference numbers to the reference numbers in the drawing(s) to obtain a directional relationship among various description information. The generating module is used to generate a relationship graph according to the directional relationship among the various description information and to store the relationship graph.

In an embodiment, the implicit information further comprises an entity relationship of technical terms. Still referring to FIG. 17, the knowledge extraction module 200 further comprises a specification analysis module 203 for processing the patent specification to obtain the entity relationship of the technical terms through a reasoning algorithm based on specification analysis.

Figure 21:
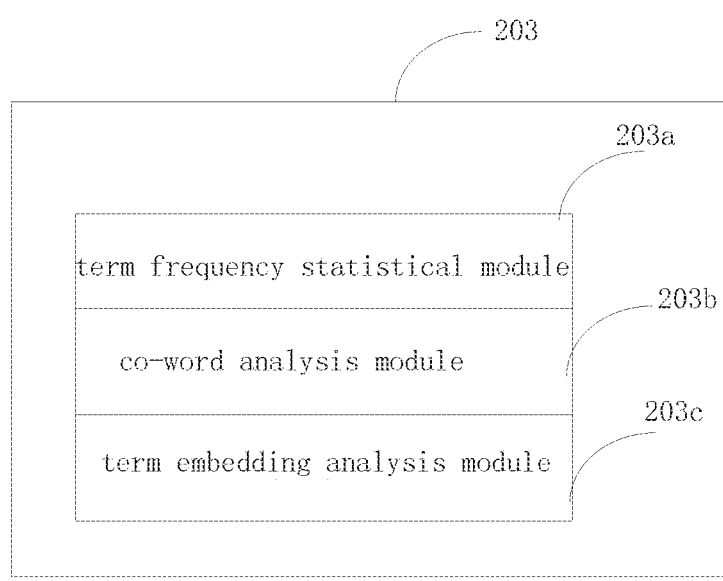
FIG. 21 illustrates a structural diagram of a specification analysis module according to an embodiment.

In an embodiment, referring to FIG. 21, the specification analysis module 203 comprises a term frequency statistical module 203a, a co-word analysis module 203b, and a term embedding analysis module 203c.

The term frequency statistical module 203a is configured to process the patent specification through a term frequency statistical algorithm;

The co-word analysis module 203b is configured to process the patent specification through a co-word analysis algorithm.

The term embedding analysis module 203c is configured to process the patent specification through a term embedding analysis algorithm.

Figure 22:
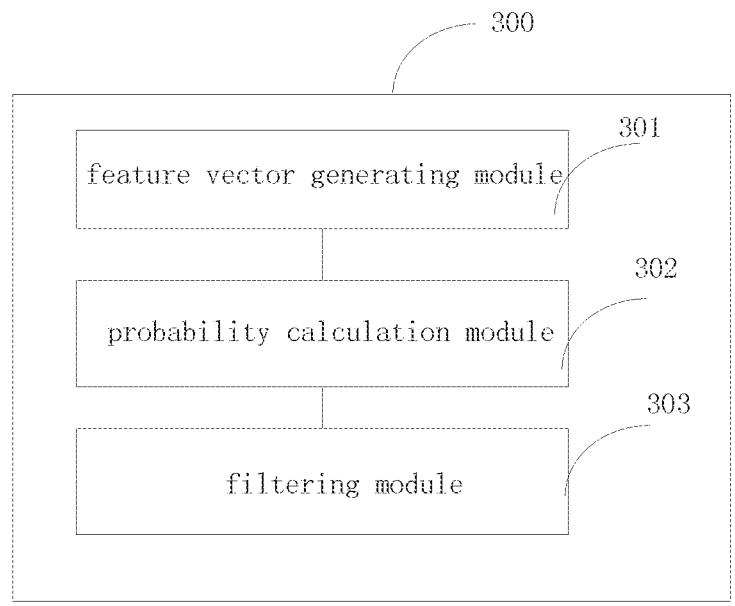
FIG. 22 illustrates a structural diagram of a fusion processing module according to an embodiment.

In an embodiment, referring to FIG. 22, the fusion processing module 300 comprises a feature vector generating module 301, a probability calculation module 302, and a filtering module 303.

The feature vector generating module 301 is configured to generate corresponding feature vectors according to various entity relationships included in the implicit information;

The probability calculation module 302 is configured to judge the various entity relationships according to the feature vectors by a linear classifier and calculate a probability that the various entity relationships are true relationships.

The filtering module 303 is configured to filter the various entity relationships whose probability is less than a set threshold.

In an embodiment, the device for constructing a patent knowledge database further comprises an update module for updating the patent knowledge database.

For the specific process by which the device constructs a patent knowledge database, please refer to the forgoing method for constructing a patent knowledge database, which will not be described here. The various modules in the above-mentioned device for constructing a patent knowledge database can be implemented in whole or in part by software, hardware, or combinations thereof. The foregoing modules can be embedded in the form of hardware or independent of the processor in the computing device, or can be stored in the memory of the computing device in the form of software, so that the processor can call and execute the operations corresponding to the foregoing modules.

Figure 23:
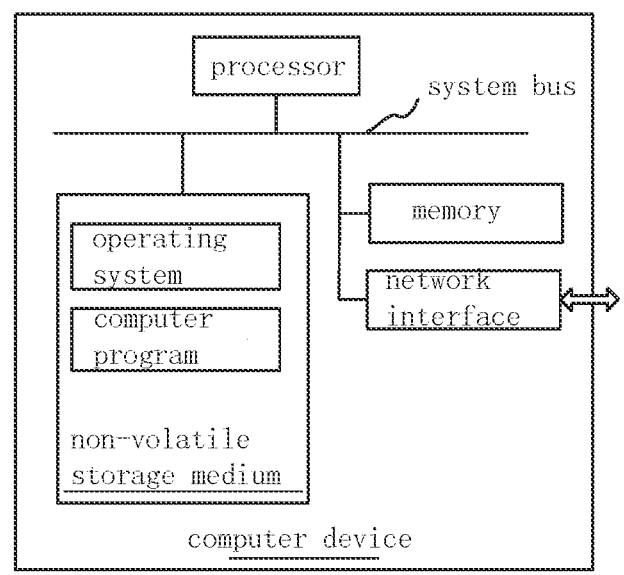
FIG. 23 illustrates an internal structural view of a computer device according to an embodiment.

In an embodiment, a computer device is provided. The computer device can be a server, and FIG. 23 illustrates an internal structure diagram of the computer device. The computer device comprises a processor, a memory, and a network interface connected through a system bus. Therein, the processor of the computer device is used to provide calculation and control capabilities. The memory of the computer device comprises a non-volatile storage medium and an internal memory. The non-volatile storage medium stores an operating system, a computer program, and a database. The internal memory provides an environment for the operation of the operating system and computer programs in the non-volatile storage medium. The network interface of the computer device is used to communicate with an external terminal through a network connection. The computer program is executed by the processor to realize a method of constructing a patent knowledge database.

Those skilled in the art can understand that the structure shown in FIG. 23 is only a block diagram of part of the structure related to the solution of the present application and does not constitute a limitation on the computer device to which the solution of the present disclosure is applied. The specific computer device may comprise more or less parts than shown in the drawing, or combine some parts, or have a different part arrangement.

In an embodiment, a computer device is provided. The computer device comprises a memory and a processor, and a computer program is stored in the memory. The processor implements the following method executing the computer program.

Obtaining Patent Resource Data.

Analyzing the patent resource data to obtain explicit information and implicit information. The explicit information comprises attribute information of each entity in a preset entity set, and the implicit information comprises an entity relationship of technical elements.

Fusing the implicit information to obtain fused implicit information, and constructing a patent knowledge database according to the explicit information and the fused implicit information.

In addition, when the processor executes the computer program, each step in the embodiment of the method for constructing the above-mentioned patent knowledge database can also be implemented, which will not be described here.

In an embodiment, a computer-readable storage medium is provided, on which a computer program is stored, and when the computer program is executed by a processor, the computer program implements the following method.

Obtaining Patent Resource Data.

Analyzing the patent resource data to obtain explicit information and implicit information. The explicit information comprises attribute information of each entity in a preset entity set, and the implicit information comprises an entity relationship of technical elements.

Fusing the implicit information to obtain fused implicit information, and constructing a patent knowledge database according to the explicit information and the fused implicit information.

In addition, when the computer program is executed by the processor, each step in the embodiment of the method for constructing the above-mentioned patent knowledge database can also be implemented, which will not be described here.

A person skilled in the art can understand that all or part of the processes in the above-mentioned embodiments can be implemented by instructing relevant hardware through a computer program. The computer program can be stored in a non-volatile computer readable storage medium. When the computer program is executed, the computer program may comprise the procedures of the above-mentioned method embodiments. Therein, any reference to memory, storage, database, or other medium used in the embodiments provided in this disclosure may comprise non-volatile and/or volatile memory. Non-volatile memory may comprise read-only memory (ROM), programmable ROM (PROM), electrically programmable ROM (EPROM), electrically erasable programmable ROM (EEPROM), or flash memory. Volatile memory may comprise random access memory (RAM) or external cache memory. As an illustration and not a limitation, RAM is available in many forms, such as static RAM (SRAM), dynamic RAM (DRAM), synchronous DRAM (SDRAM), double data rate SDRAM (DDRS-DRAM), enhanced SDRAM (ESDRAM), synchronous link (Synchlink) DRAM (SLDRAM), memory bus (Rambus) direct RAM (RDRAM), direct memory bus dynamic RAM (DRDRAM), memory bus dynamic RAM (RDRAM), etc.

The technical elements of the above embodiments can be combined arbitrarily. In order to make the description concise, all possible combinations of the technical elements in the above embodiments are not described. However, as long as there is no contradiction in the combinations of these technical elements, the combinations should be considered as the scope of this disclosure.

The aforementioned embodiments are merely some embodiments of the present disclosure, the description is specific and detailed, and the scope of the disclosure of is not limited thereto. Thus, according to a person skilled in the art, it is intended that the present disclosure cover any modifications and variations of the presently presented embodiments provided they are made without departing from the appended claims and the specification of the present disclosure. Therefore, the scope of the present disclosure is determined according to the claims.

What is claimed is:

1. A method for constructing a patent knowledge database, comprising:
obtaining patent resource data,
analyzing the patent resource data to obtain explicit information and implicit information,
fusing the implicit information to filter out noise data and obtain fused implicit information, and
constructing the patent knowledge database according to the explicit information and the fused implicit information, wherein:
the explicit information comprises attribute information of each entity,
the implicit information comprises various entity relationships of technical elements,
the patent resource data comprises a patent specification and one or more drawings corresponding to the patent specification,
analyzing the patent resource data to obtain the implicit information comprises processing the patent specification and the one or more drawings to obtain the various entity relationships of the technical elements through a specification-drawing matching analysis method,
processing the patent specification and the one or more drawings through the specification-drawing matching analysis method comprises:
extracting basic feature information of the one or more drawings through a feature extraction convolutional network in a deep neural network model,
processing the basic feature information through a specification detection convolutional network in the deep neural network model to detect reference numbers of the technical elements and position information of the reference numbers from the one or more drawings,
extracting description information corresponding to each of the reference numbers from the patent specification,
determining a directional relationship between the reference numbers according to the position information of the reference numbers, and
matching the reference numbers, the directional relationship between the reference numbers, and the description information corresponding to the reference numbers to obtain the various entity relationships of the technical elements,
fusing the implicit information comprises:
generating corresponding feature vectors according to the various entity relationships of the technical elements comprised in the implicit information,
using a linear classifier to judge the corresponding feature vectors of the various entity relationships of the technical elements according to the corresponding feature vectors,
calculating a probability that the various entity relationships of the technical elements are real relationships, and
filtering the various entity relationships of the technical elements whose probability are less than a set threshold, and
a loss function of the deep neural network model is:

$$L(x, c, 1, g) = \frac{1}{N}(L_{conf}(x, c) + aL_{loc}(x, l, g))$$

wherein, x represents a matching matrix of the reference numbers, c represents a confidence of a detection, 1 represents a predicted reference number position, g represents a real reference number position, N represents a number of default bounding boxes that matches real bounding boxes, $L_{conf}$(x,c) represents a loss of the confidence, $L_{loc}$(x, l, g) represents a loss of the position information, and a represents a balance factor.

2. The method for constructing the patent knowledge database according to claim 1, wherein analyzing the patent resource data to obtain the explicit information comprises extracting the explicit information from structural information from the patent specification through a named entity recognition algorithm.

3. The method for constructing the patent knowledge database according to claim 1, wherein processing the patent specification and the one or more drawings through the specification-drawing matching analysis method further comprises:
matching the reference numbers, the position information of the reference numbers, and the description information corresponding to the reference numbers.

4. The method for constructing the patent knowledge database according to claim 1, wherein extracting the description information corresponding to each of the reference numbers from the patent specification comprises:
extracting named entities from the patent specification through a supervised learning algorithm based on a bi-LSTM (Long Short Term Memory) network model, and
associating the named entities and the reference numbers to obtain the description information corresponding to each of the reference numbers.

5. The method for constructing the patent knowledge database according to claim 1, wherein matching the reference numbers, the directional relationship between the reference numbers, and the description information corresponding to the reference numbers comprises:
matching the description information corresponding to the reference numbers to the reference numbers in the one or more drawings to obtain a directional relationship between various description information, and
generating a relationship graph according to the directional relationship among the various description information and storing the relationship graph.

6. The method for constructing the patent knowledge database according to claim 1, wherein:
the implicit information further comprises an entity relationship of technical terms, and
analyzing the patent resource data to obtain the implicit information comprises processing the patent specification to obtain the entity relationship of the technical terms by a reasoning algorithm based on specification analysis.

7. The method for constructing the patent knowledge database according to claim 6, wherein processing the patent specification by the reasoning algorithm based on the specification analysis comprises:
processing the patent specification through at least one of a term frequency statistical algorithm, a co-word analysis algorithm, or a term embedding analysis algorithm.

8. A device for constructing a patent knowledge database, comprising:
a resource acquisition module,
a knowledge extraction module,
a fusion processing module, and
a construction module, wherein:
the resource acquisition module is used to acquire patent resource data,
the knowledge extraction module is used to analyze the patent resource data to obtain explicit information and implicit information,
the explicit information comprises attribute information of each entity,
the implicit information comprises various entity relationships of technical elements,
the fusion processing module is used to fuse the implicit information to filter out noise data and obtain fused implicit information,
the construction module is used to construct the patent knowledge database to obtain the patent resource data according to the explicit information and the fused implicit information,
the patent resource data comprises a patent specification and one or more drawings corresponding to the patent specification,
analyzing the patent resource data to obtain the implicit information comprises processing the patent specification and the one or more drawings to obtain the various entity relationships of the technical elements through a specification-drawing matching analysis method,
processing the patent specification and the one or more drawings through the specification-drawing matching analysis method comprises:
extracting basic feature information of the one or more drawings through a feature extraction convolutional network in a deep neural network model,
processing the basic feature information through a specification detection convolutional network in the deep neural network model to detect reference numbers of the technical elements and position information of the reference numbers from the one or more drawings,
extracting description information corresponding to each of the reference numbers from the patent specification,
determining a directional relationship between the reference numbers according to the position information of the reference numbers, and
matching the reference numbers, the directional relationship between the reference numbers, and the description information corresponding to the reference numbers to obtain the various entity relationships of the technical elements,
fusing the implicit information comprises:
generating corresponding feature vectors according to the various entity relationships of the technical elements comprised in the implicit information,
using a linear classifier to judge the corresponding feature vectors of the various entity relationships of the technical elements according to the feature vectors,
calculating a probability that the various entity relationships of the technical elements are real relationships, and
filtering the various entity relationships of the technical elements whose probability are less than a set threshold, and
a loss function of the deep neural network model is:

$$L(x, c, 1, g) = \frac{1}{N}(L_{conf}(x, c) + a\ L_{loc}(x, l, g))$$

wherein, x represents a matching matrix of the reference numbers, c represents a confidence of a detection, l represents a predicted reference number position, g represents a real reference number position, N represents a number of default bounding boxes that matches real bounding boxes, $L_{conf}$(x,c) represents a loss of the confidence, $L_{loc}$(x, l, g) represents a loss of the position information, and a represents a balance factor.

9. A computing device, comprising:
a memory storing a computer program, and
a processor, wherein:
the processor executes the computer program to implement a method for constructing a patent knowledge database, comprising:
obtaining patent resource data,
analyzing the patent resource data to obtain explicit information and implicit information,
fusing the implicit information to filter out noise data and obtain fused implicit information, and
constructing the patent knowledge database according to the explicit information and the fused implicit information, wherein:
the explicit information comprises attribute information of each entity,
the implicit information comprises various entity relationships of technical elements,
the patent resource data comprises a patent specification and one or more drawings corresponding to the patent specification,
analyzing the patent resource data to obtain the implicit information comprises processing the patent specification and the one or more drawings to obtain the various entity relationships of the technical elements through a specification-drawing matching analysis method,
processing the patent specification and the one or more drawings through the specification-drawing matching analysis method comprises:
extracting basic feature information of the one or more drawings through a feature extraction convolutional network in a deep neural network model,
processing the basic feature information through a specification detection convolutional network in the deep neural network model to detect reference numbers of the technical elements and position information of the reference numbers from the one or more drawings, extracting description information corresponding to each of the reference numbers from the patent specification,
determining a directional relationship between the reference numbers according to the position information of the reference numbers, and
matching the reference numbers, the directional relationship between the reference numbers, and the description information corresponding to the reference numbers to obtain the various entity relationships of the technical elements,
fusing the implicit information comprises:
generating corresponding feature vectors according to the various entity relationships of the technical elements comprised in the implicit information,
using a linear classifier to judge the corresponding feature vectors of the various entity relationships of the technical elements according to the corresponding feature vectors,
calculating a probability that the various entity relationships of the technical elements are real relationships, and
filtering the various entity relationships of the technical elements whose probability are less than a set threshold, and
a loss function of the deep neural network model is:

$$L(x, c, 1, g) = \frac{1}{N}(L_{conf}(x, c) + a\, L_{loc}(x, l, g))$$

wherein, x represents a matching matrix of the reference numbers, C represents a confidence of a detection, 1 represents a predicted reference number position, g represents a real reference number position, N represents a number of default bounding boxes that matches real bounding boxes, $L_{conf}(x,c)$ represents a loss of the confidence, $L_{loc}(x, l, g)$ represents a loss of the position information, and a represents a balance factor.

10. A non-transitory computer-readable storage medium, wherein:
a computer program is stored on the non-transitory computer-readable storage medium, and when the computer program is executed by a processor, the computer program implements a method for constructing a patent knowledge database, comprising:
obtaining patent resource data,
analyzing the patent resource data to obtain explicit information and implicit information,
fusing the implicit information to filter out noise data and obtain fused implicit information, and
constructing the patent knowledge database according to the explicit information and the fused implicit information, wherein:
the explicit information comprises attribute information of each entity,
the implicit information comprises various entity relationships of technical elements,
the patent resource data comprises a patent specification and one or more drawings corresponding to the patent specification,
analyzing the patent resource data to obtain the implicit information comprises processing the patent specification and the one or more drawings to obtain the various entity relationships of the technical elements through a specification-drawing matching analysis method,
processing the patent specification and the one or more drawings through the specification-drawing matching analysis method comprises:
extracting basic feature information of the one or more drawings through a feature extraction convolutional network in a deep neural network model,
processing the basic feature information through a specification detection convolutional network in the deep neural network model to detect reference numbers of the technical elements and position information of the reference numbers from the one or more drawings,
extracting description information corresponding to each of the reference numbers from the patent specification,
determining a directional relationship between the reference numbers according to the position information of the reference numbers, and
matching the reference numbers, the directional relationship between the reference numbers, and the description information corresponding to the reference numbers to obtain the various entity relationships of the technical elements,
fusing the implicit information comprises:
generating corresponding feature vectors according to the various entity relationships of the technical elements comprised in the implicit information,
using a linear classifier to judge the corresponding feature vectors of the various entity relationships of the technical elements according to the corresponding feature vectors,
calculating a probability that the various entity relationships of the technical elements are real relationships, and
filtering the various entity relationships of the technical elements whose probability are less than a set threshold, and
a loss function of the deep neural network model is:

$$L(x, c, 1, g) = \frac{1}{N}(L_{conf}(x, c) + a\, L_{loc}(x, l, g))$$

wherein, x represents a matching matrix of the reference numbers, c represents a confidence of a detection, 1 represents a predicted reference number position, g represents a real reference number position, N represents a number of default bounding boxes that matches real bounding boxes, $L_{conf}(x,c)$ represents a loss of the confidence, $L_{loc}(x, l, g)$ represents a loss of the position information, and a represents a balance factor.

11. The method for constructing the patent knowledge database according to claim 1, wherein:
the deep neural network model inherits a VGG-16 network structure of a convolutional neural network, retains a network from conv1_1 to conv5_3 of the VGG-16 network structure, and converts a last two layers of fully connected network into convolutional networks, namely conv6 and conv7, and four convolutional networks, conv8 to conv11, are added to the convolutional network conv7 to define the feature extraction convolutional network; and the specification detection convolutional network has a 6-layer convolutional network structure, an input of the 6-layer convolutional network structure is basic feature information of an output of the feature extraction convolutional network, and an output of the specification detection convolutional network undergoes a non-maximum compression to generate final reference numbers and position information of the final reference numbers.

12. The method for constructing the patent knowledge database according to claim 1, wherein:

each of the corresponding feature vectors is a two-dimensional digital feature vector, a first dimension of the two-dimensional digital feature vector represents a square root of a number of the patent resource data configured to obtain the various entity relationships of the technical elements, and a second dimension of the two-dimensional digital feature vector represents an average value of scores of the various entity relationships of the technical elements by a scoring method.

13. The method for constructing the patent knowledge database according to claim 4, wherein:

the patent specification and corresponding reference symbol of the patent specification is two sequences, and past features and future features of the two sequences are simultaneously modeled by a forward network and a backward network of LSTM (Long Short Term Memory), a sliding window having a length of n is disposed respectively in the two sequences, the forward network and the backward network are used to describe characteristics of the sliding window, and a CRF (conditional random field) method is used to mark words in the sliding window.

* * * * *